2,989,523
2-METHYL-6-FLUORO COMPOUNDS OF THE PREGNANE SERIES
Philip F. Beal III, John A. Hogg, and Robert W. Jackson, Kalamazoo, Mich., assignors to The Upjohn Company, Kalamazoo, Mich., a corporation of Michigan
No Drawing. Filed June 9, 1958, Ser. No. 740,543
3 Claims. (Cl. 260—239.55)

This invention relates to novel 2-methyl-6α-fluoro- and 2-methyl-6β-fluoro compounds of the pregnane series. It relates more particularly to the 6α and 6β epimeric forms of (A) 2-methyl-6-fluoro-11-oxygenated-17α,21-dihydroxy-1,4-pregnadiene-3,20-diones and the 21-acylates thereof, for example, 2-methyl-6-fluoro-11β,17α,21-trihydroxy-1,4-pregnadiene-3,20-diones and 2-methyl-6-fluoro-17α,21-dihydroxy-1,4-pregnadiene-3,11,20-triones, and the 21-acylates thereof; (B) 2α-methyl-6-fluoro-9α-halo-11-oxygenated-17α,21-dihydroxy-4-pregnene-3,20-diones and the 21-acylates thereof, for example 2α-methyl-6-fluoro-9α-halo-11β,17α,21-trihydroxy-4-pregnene 3,20-diones and 2α-methyl-6-fluoro-9α-halo-17α,21-dihydroxy-4-pregnene - 3,- 11,20-triones, and the 21-acylates thereof; (C) 2-methyl-6-fluoro-9α-halo-11-oxygenated - 17α,21 - dihydroxy-1,4-pregnadiene-3,20-diones and the 21-acylates thereof, for example, 2-methyl-6-fluoro-9α-halo-11β,17α,21 - trihydroxy-1,4-pregnadiene-3,20-diones and 2-methyl-6-fluoro-9α-halo-17α,21-dihydroxy-1,4-pregnadiene-3,11,20-triones and the 21-acylates thereof; (D) 2α-methyl-6-fluoro-11-oxygenated-17α-hydroxy-4-pregnene-3,20-diones and the corresponding 1-dehydro-2-methyl compounds, for example 2α-methyl-6-fluoro-11β,17α-dihydroxy-4-pregnene-3,20-diones, 2α-methyl-6-fluoro-17α-hydroxy-4-pregnene-3,11,20-triones, 2-methyl-6-fluoro-11β,17α-dihydroxy-1,4-pregnadiene-3,20-diones, and 2-methyl-6-fluoro-17α-hydroxy-1,4-pregnadiene-3,11,20-triones; (E) 2α-methyl-6,-21-difluoro-11-oxygenated-17α-hydroxy-4-pregnene - 3,20-diones and the corresponding 1-dehydro-2-methyl compounds, for example, 2α-methyl 6,21-difluoro-11β,17α-dihydroxy-4-pregnene-3,20-diones, 2α-methyl-6,21-difluoro-17α-hydroxy-4-pregnene-3,11,20-triones, 2-methyl-6,21-difluoro - 11β,17α-dihydroxy-1,4-pregnadiene-3,20 - diones, and 2-methyl-6,21-difluoro-17α-hydroxy-1,4-pregnadiene-3,11, 20-triones; (F) 2α-methyl-6-fluoro-9α-halo-11-oxygenated-17α-hydroxy-4-pregnene-3,20-diones and the corresponding 1-dehydro-2-methyl compounds, for example, 2α-methyl-6-fluoro - 9α-halo - 11β,17α-dihydroxy-4-pregnene - 3,20-diones, 2α-methyl-6-fluoro-9α-halo - 17α-hydroxy-4-pregnene-3,11,20-triones, 2-methyl-6-fluoro - 9α-halo-11β,17α-dihydroxy-1,4-pregnadiene-3,20-diones, and 2-methyl-6-fluoro-9α-halo-17α-hydroxy-1,4 - pregnadiene-3,11,20-triones; (G) 2α-methyl-6,21-difluoro-9α-halo - 11-oxygenated-17α-hydroxy-4-pregnene-3,20-diones and the corresponding 1-dehydro-2-methyl compounds, for example 2α-methyl - 6,21-difluoro-9α-halo-11β,17α - dihydroxy-4-pregnene-3,20-diones, 2α-methyl-6,21-difluoro-9α-halo-17α-hydroxy-4-pregnene-3,11,20-triones, 2-methyl-6,-21-difluoro-9α-halo-11β,17α - dihydroxy-1,4-pregnadiene-3,20-diones, and 2-methyl-6,21-difluoro-9α-halo-17α-hydroxy-1,4-pregnadiene-3,11,20-triones; novel steroid intermediates used in the preparation thereof and processes for the production thereof.

This application is a continuation-in-part of copending application Serial No. 699,508, filed November 29, 1957 now Patent No. 2,838,502 issued June 10, 1958.

The novel compounds of this invention, listed above under (A), (B), (C), (D), (E), (F) and (G) possess the valuable anti-rheumatoid arthritic, anti-inflammatory and glucocorticoid activity of the parent 6-fluoro compounds (2α-methyl-6-fluorohydrocortisone and the 21-acylates thereof, and 2α-methyl-6-fluorocortisone and the 21-acylates thereof). They possess a combination of high anti-inflammatory and glucocorticoid activities with favorable mineralocorticoid properties. The compounds are useful in the treatment of inflammatory conditions of the skin, eyes and ears of humans and valuable domestic animals, contact dermatitis and other allergenic reactions. The compounds can be administered in conventional dosage forms such as pills, tablets and capsules for oral use or in conventional liquid forms as are used with natural and synthetic cortical steroid hormones for parenteral use. For topical use they can be administered in the form of ointments, creams, lotion, and the like with or without coacting antibiotics, germicides and the like.

Starting materials for the processes of this invention, 2α-methyl-6α-fluoro-11β,17α,21-trihydroxy-4-pregnene-3,-20-dione, 2α-methyl-6α-fluoro - 17α,21-dihydroxy-4-pregnene-3,11,20-trione, 2α-methyl-6β-fluoro-11β,17α,21 - trihydroxy-4-pregnene-3,20-dione, 2α-methyl-6β-fluoro-17α,-21-dihydroxy-4-pregnene-3,11,20-trione, and the 17-acylates thereof, represented by the following formula:

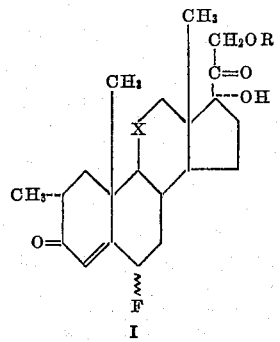

I wherein X is selected from the group consisting of the carbonyl radical (>C=O) and the hydroxymethylene radical (>CHOH), and R is hydrogen or the acyl radical of an organic carboxylic acid, preferably a hydrocarbon carboxylic acid containing from one to twelve carbon atoms, inclusive, are disclosed in our copending application Serial No. 699,508, filed November 29, 1957 and disclosed in Preparation 1 below.

In this application the wavy line ( $\xi$ ) appearing at the 6-position is a generic expression including the alpha (α) and bet (β) configuration.

GROUP A

The novel 6α-fluoro- and 6β-fluoro steroid compounds of Group (A), of the present invention 2-methyl-6-fluoro-11-oxygenated-17α,21-dihydroxy-1,4-pregnadiene-3,20-di - ones and the 21-acylates thereof, for example 2-methyl-6-fluoro-11β,17α,21-trihydroxy-1,4-pregnadiene-3,20-diones, 2-methyl-6-fluoro-17α,21-dihydroxy-1,4-pregnadiene-3,11, 20-triones, and the 21acylates thereof, are represented by the following formula:

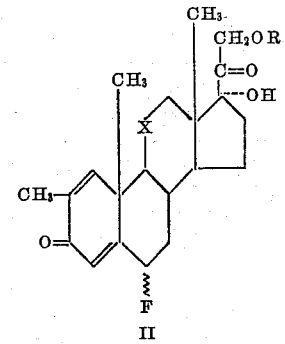

II wherein X and R have the meanings previously given. The novel compounds of Group (A) and some of the processes of the present invention are illustratively represented by the following reaction scheme:

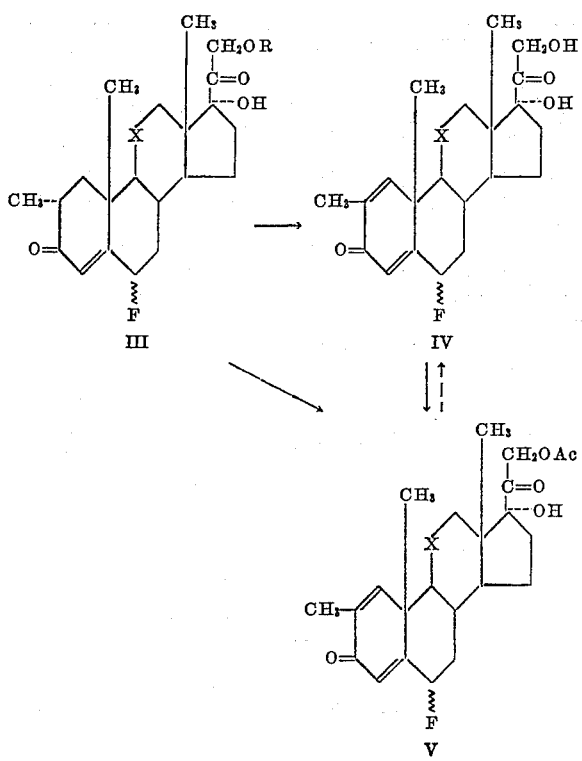

wherein X and R have the meanings previously given, and wherein Ac is the acyl radical of an organic carboxylic acid, preferably a hydrocarbon carboxylic acid containing from one to twelve carbon atoms, inclusive.

According to the process of the present invention for the production of 2-methyl-6-fluoro-11-oxygenated-17α,21-dihydroxy-1,4-pregnadiene-3,20-dione and the 21-acylates thereof, represented by Formulae IV and V, compounds of the type represented by Formula III are dehydrogenated at the 1-position. The 1-dehydrogenation of the selected 6-fluoro-11-oxygenated-17α,21-dihydroxy-4-pregnene-3,20-dione, or the 21-acylates thereof, represented by Formula III, can be carried out either by fermentative or chemical dehydrogenation.

Fermentative dehydrogenation comprises the use of microorganisms such as Septomyxa, Corynebacterium, Fusarium, and the like, under fermentation conditions well known in the art (e.g., U.S. 2,602,769) and furthermore illustrated by Examples 1A through 4A, herein. Where Septomyxa is used to effect the dehydrogenation it is found to be advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatrien-3-one, and the like. The free alcohols are usually employed as starting material for the fermentative dehydrogenation process. However, the selected 2α-methyl 6-fluoro-11-oxygenated-17α,21-dihydroxy-4-pregnene-3,20-dione 21-acylates of Formula III can be used such as the 21-acetate, 21-propionate, 21-butyrate, 21-isobutyrate, 21-hemisuccinate, and the like. In these cases the 21-ester group is generally saponified during the fermentation process giving the corresponding 2-methyl-6-fluoro-11-oxygenated-17α,21-dihydroxy-1,4-pregnadiene-3,20-dione represented by Formula IV. The 21-free alcohol thus produced can be reacylated, if desired, by known 21-acylation methods.

Chemical dehydrogenation can be carried out with selenium dioxide according to procedures well known in the art [Meystre et al., Helv. Chem. Acta, 39, 734 (1956)]. The 21-acylates of Formula III are generally preferred as starting material in the chemical dehydrogenation reaction giving the corresponding 2α-methyl-6-fluoro-11-oxygenated-17α,21-dihydroxy-1,4-pregnadiene-3,20-dione 21-acylate represented by Formula V. The 21-acylate thus obtained can be saponified, if desired, by methods known in the art to give the 21-free alcohol of the corresponding 21-acylate.

The 2-methyl-6-fluoro-11-oxygenated-17α,21-dihydroxy-1,4-pregnadiene-3,20-diones, represented by Formula IV, can be converted to the corresponding 21-acylates of Formula V by reaction with the selected acylating agent. This reaction can be performed under the esterification conditions known in the art, e.g., by the reaction of IV with the selected acid halide or acid chloride or acid bromide or the anhydride of an organic carboxylic acid, or by reaction with the selected acid, in the presence of an esterification catalyst, for example, p-toluenesulfonyl chloride, trifluoroacetic anhydride, p-toluenesulfonic acid, trifluoroacetic acid, sulfuric acid, and the like, or with an ester under ester exchange reaction conditions. Reaction conditions which are apt to affect the labile 11-hydroxy group or 6-halo group should be avoided. Compounds thus-produced include the compounds represented by Formula V wherein Ac is the acyl radical of a hydrocarbon carboxylic acid containing from one to twelve carbon atoms, inclusive, for example, a saturated straight-chain aliphatic acid, e.g., formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., β-cyclopentylpropionic, cyclohexane-carboxylic, cyclohexylacetic, an alkaryl acid, e.g., benzoic, phenylacetic, β-phenylpropionic, o-, m-, and p-toluic, a saturated dibasic acid (which can be converted into water-soluble, e.g., sodium, salts), e.g., succinic, adipic; a monobasic unsaturated acid, e.g., acrylic, crotonic, undecylenic, propiolic, undecolic, cinnamic; dibasic unsaturated acids (which can be converted into water-soluble, e.g., sodium, salts), e.g., maleic and citraconic, and the like.

The 2-methyl-6-fluoro-11-oxygenated-17α,21-dihydroxy-1,4-pregnadiene-3,20-dione 21-acylates of Formula V, thus-produced, can be hydrolyzed to the corresponding 21-hydroxy compounds of Formula IV in accordance with known methods for hydrolyzing Compound F 21-esters to the free Compound F alcohol. A preferred procedure is to employ at least a molar equivalent of an alkali metal bicarbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e.g., acetic acid, and the hydrolyzed product recovered from the reaction mixture by evaporation and crystallization, extraction with methylene chloride or the like.

The foregoing compounds III, IV and V are all characterized by the presence of a 6-fluoro substituent. It should be noted that the configuration of the fluorine at the 6-position can be either 6α or 6β. Thus when 2α-methyl 6β-fluoro-11-oxygenated-17α,21-dihydroxy-4-pregnene-3-20-dione or the 21-acylate thereof is used as the starting steroid (III) and following the procedures hereinbefore described and as exemplified below, while maintaining near neutral reaction conditions, there is produced as the final product the corresponding 6β-epimer. Where the 6β-epimer or mixtures predominating therein is employed as the starting material, any subsequent reaction product can be isolated either as the 6β-epimer or the aforesaid mixtures of 6α- and 6β-epimers, or a 6α-epimerized product can be obtained by treatment of the 6β-epimer or mixtures of the 6α- and 6β-epimers at temperatures of near zero degrees centigrade, in an organic solvent, such as chloroform, methylene chloride, ether, and the like, and in the presence of a prototropic agent (proton-donating reagent) such as alcohols, organic acids, and the like, with a hydrogen halide such as hydrogen chloride gas. The mixture should be maintained at temperatures near zero degrees centigrade although slightly higher or lower temperatures can be used, during the addition of the acid. The reaction mixture can then be washed with successive portions of dilute alkali and water, and then dried and evaporated under reduced pressure. The 6α-fluoro products can be recovered from the crude reaction product and purified by recrystallization.

Alternatively, the epimerization can be accomplished with alkali. Bases, for example, solutions of sodium hydroxide and potassium hydroxide, may be used to treat the 6β-epimer in solution in an organic solvent, such as methanol, to produce the 6α-epimer.

GROUP B

The novel 6α-fluoro and 6β-fluoro steroid compounds of Group (B) of the present invention, 2α-methyl-6-fluoro-9α-halo-11-oxygenated-17α,21 - dihydroxy-4-pregnene-3,20-diones and the 21-acylates thereof, for example 2α-methyl-6-fluoro-9α-halo-11β,17α,21-trihydroxy-4-pregnene-3,20-diones and 2α - methyl-6-fluoro-9α-halo-17α,21-dihydroxy-4-pregnene-3,11,20-triones, and the 17-acylates thereof, are represented by the following formula:

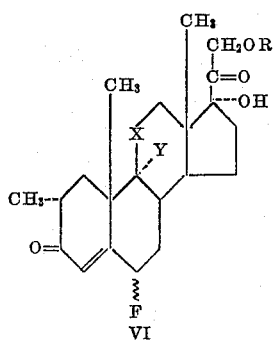

VI wherein X and R have the meanings previously given, and Y is halogen.

The compounds of Group (B) of the present invention can be prepared in accordance with the following reactions.

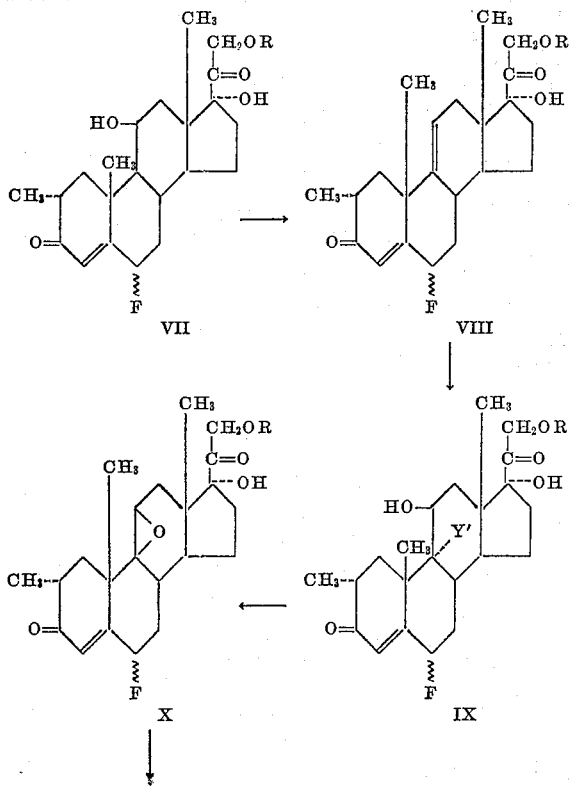

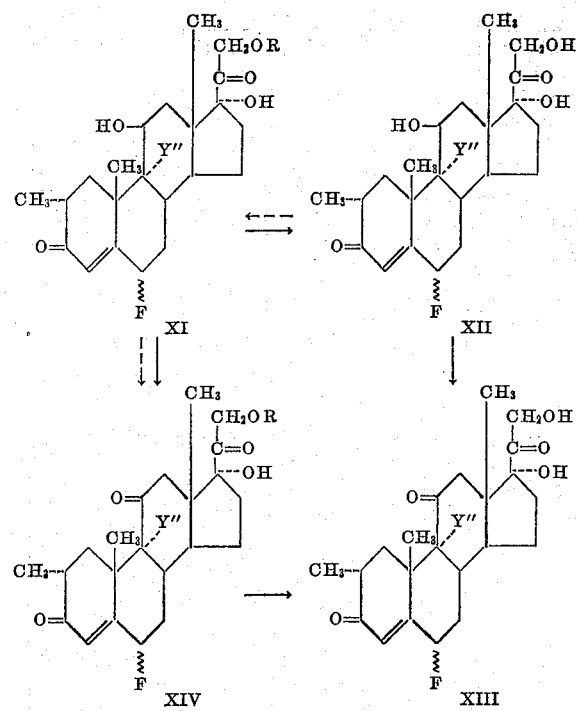

wherein R has the meanings previously given, Y' is bromo, chloro or iodo, and Y" is fluoro, chloro or bromo.

The process for preparing Group B compounds is carried out generally in accordance with processes for preparing 9α-halohydrocortisone and comprises first the dehydration of 2α-methyl-6-fluoro-11β,17α,21-trihydroxy-4-pregnene-3,20-dione 21-acylate to obtain 2α-methyl-6-fluoro-17α,21-dihydroxy-4,9(11)-pregnadiene - 3,20-dione 21-acylate, followed by treatment of the dehydration product with a source of hypohalous acid in which the halogen is bromine, chlorine, or iodine to produce the corresponding 2α-methyl-6-fluoro-9α-halo-11β,17α,21-trihydroxy-4-pregnene-3,20-dione 21-acylate. The said 9α-halo compound is then epoxidized with a mild base to give 2α-methyl-6-fluoro-9β,11β-oxido-17α,21-dihydroxy-4-pregnene-3,20-dione 21-acylate. Halogenation of the said 9,11-oxido compound, the halogenating agent being one which provides a source of fluorine, chlorine or bromine, gives the corresponding 2α-methyl-6-fluoro-9α-halo-11β,17α,21-trihydroxy-4-pregnene - 3,20 - dione 21-acylate. Upon hydrolysis of the said 9α-halo 21-acylate there is produced 2α-methyl-6-fluoro-9α-halo-11β,17α,21-trihydroxy-4-pregnene-3,20-dione, which can be oxidized by known methods to produce 2α-methyl-6-fluoro-9α-halo-17α,21-dihydroxy-4-pregnene-3,11,20-trione. Alternatively, 2α - methyl 6-fluoro-9α-halo-11β,17α,21-trihydroxy-4-pregnene-3,20-dione 21-acylate can be oxidized to produce the 2α-methyl-6-fluoro-9α-halo-17α,21-dihydroxy-4-pregnene-3,11,20-trione 21 acylate, which can be hydrolyzed to give the 2α-methyl-6-fluoro-9α-halo-17α, 21-dihydroxy-4-pregnene-3,11,20-trione.

The starting steroids for the process of preparation of the compounds of Group (B) of the present invention are 2α-methyl-6α-fluoro-11β,17α,21-trihydroxy - 4 - pregnene-3,20-dione 21-acylate and 2α-methyl-6β-fluoro-11β, 17α,21-trihydroxy-4-pregnene-3,20-dione 21-acylate which are prepared in accordance with the procedures disclosed in our copending application Serial No. 699,508, filed November 29, 1957, now Pat. No. 2,838,502, and disclosed in Preparation 1 below.

In carrying out this novel process of this invention, 2α-methyl-6-fluoro-11β,17α,21-trihydroxy - 4 - pregnene-3,20-dione 21-acylate (VII) is dehydrated to the corresponding 21-acylate of 2α-methyl-6-fluoro-17α,21-dihydroxy-4,9(11)-pregnadiene-3,20-dione (VIII) by methods known in the art, e.g., by a dehydrating agent such as phosphorous oxychloride, thionyl chloride, hydrochloric acid or sulfuric acid and acetic acid or by pyrolysis as shown in U.S. Patents 2,640,838 and 2,640,839, or the dehydration can be effected by the preferred method of reacting the 2α-methyl-6-fluoro-11β,17α,21-trihydroxy-4-pregnene-3,20-dione 21-acylate with a carboxylic acid N-haloamide or N-haloimide, wherein the halogen is bromine or chlorine, in an organic base either with or followed by anhydrous sulfur dioxide. Examples of such N-haloamides or N-haloimides are N-chloroacetamide, N-bromoacetamide, N-chlorosuccinimide, N-bromosuccinimide, 3-bromo-5,5-dimethylhydantoin, 1,3-dibromo-5,5-dimethylhydantoin and the like, N-bromoacetamide being preferred. The organic bases employed as solvents in the above reaction are generally tertiary amines wherein the amino nitrogen is a member of an aromatic ring, such as the pyridines and lower fatty amides, pyridine being preferred. Normally an amount in excess of molar equivalent of organic base calculated on the basis of the quantity of starting steroid is employed. The sulfur dioxide is advantageously employed in substantially anhydrous form, inasmuch as the presence of water tends to decrease the yield of dehydrated product. The temperature of the reaction is generally between minus forty and plus seventy degrees centigrade, the lower limit being determined by the solubility of the substituents in the solvent selected and the upper limit by the amount of side reaction which normally accompanies reactions involving halogen compounds at higher temperatures. Ordinarily, room temperatures are preferred for convenience and because of the consistently high yields of end product which are obtained. A reaction time between about five minutes and three hours is usually employed, the specific temperature at which the reaction is conducted being determinative of the reaction time.

The thus-obtained dehydration product is converted to 2α - methyl - 6 - fluoro - 9α - halo - 11β,17α,21 - trihydroxy-4-pregnene-3,20-dione 21-acylate (IX) by reaction with a hypohalous acid. The hypohalous acid is usually produced in situ by reaction of an acid with N-haloamide or N-haloimide wherein the halogen is bromine, chlorine or iodine. The 2α-methyl-6-fluoro-17α,21-dihydroxy-4,9(11)-pregnadiene-3,20-dione 21-acylate is dissolved in an organic solvent such as methylene chloride, tertiary butyl alcohol, dioxane, tertiary amyl alcohol or the like, and reacted at room temperature with the hypohalous acid releasing agent, which includes N-bromoacetamide, N-chloroacetamide, N-bromosuccinimide, N-iodo-succinimide, N-chlorosuccinimide, and the like, in the presence of an acid such as perchloric acid, dilute sulfuric acid, and the like. N-bromoacetamide in tertiary butyl alcohol with perchloric acid and water are the preferred reagents for this reaction. Normally the halogenation is conducted at room temperatures, between fifteen and thirty degrees centigrade, although temperatures on either side of this range are operative. The reaction period may vary from about five minutes to one hour. At the conclusion of the desired reaction, the excess hypohalous acid is destroyed by the addition of sulfites or hydrosulfites, sodium sulfite being normally employed. The resulting 2α-methyl-6-fluoro - 9α - halo - 11β,17α,21 - trihydroxy - 4 - pregnene-3,20-dione 21-acylate (IX), in which the halogen is bromine, chlorine, or iodine, can be isolated from the reaction mixture by adding an excess of water and extracting the product with organic solvents or by recovering the precipitated compound by filtration, or the crude reaction product may be employed directly in the next step of the process.

The 9α-halo compound (IX) as defined above is then epoxidized with a weak base, potassium acetate being preferred. The reaction is conducted in an inert solvent such as methanol, ethanol, acetone, dioxane, carbon tetrachloride, chloroform, and the like. The epoxidizing reaction takes place over a rather wide range of temperatures, normally from about minus fifteen degrees to the boiling point of the reaction mixture, the range between zero degrees and sixty degrees centigrade being most convenient. The reaction time may be varied considerably, depending on the temperatures employed, a period of reflux of from about eight to twenty hours producing satisfactory yields, with about eighteen hours usually being sufficient. The reaction mixture is concentrated, cooled and precipitated with water to give 2α-methyl-6-fluoro-9β,11β-oxido-17α, 21-dihydroxy-4-pregnene-3,20-dione 21-acylate (X).

In the epoxide opening step, the 9,11-oxido compound (X) is reacted with an acid halide such as hydrogen fluoride, hydrogen chloride or hydrogen bromide, hydrogen fluoride being preferred, to produce the corresponding 2α-methyl - 6 - fluoro - 9α - halo - 11β,17α,21 - trihydroxy - 4-pregnene-3,20-dione 21-acylate. The epoxide opening and halogenation is usually conducted at temperatures between about minus forty and plus fifty degrees centigrade, the preferred limits being between about zero and 25 degrees centigrade. Advantageously, the steroid is first dissolved in an organic solvent such as tetrahydrofuran, methylene chloride, and the like. In the course of the foregoing reaction, it is possible that some hydrolysis of the 21-acylate occurs, rendering the product somewhat difficult to recover by conventional methods, such as by chromatography. It is therefore preferable at the conclusion of the epoxide opening reaction to 21-acylate the product by methods commonly employed for acylating steroids, such as by treatment with the appropriate anhydride or acid halide of an organic carboxylic acid containing from one to twelve carbon atoms, inclusive, under conventional esterifying conditions. The halogenation reaction is operative at room temperatures but is preferably conducted at lower temperatures, such as zero to minus eighty degrees centigrade, with continuous stirring. The reaction time is usually from about one to 24 hours, with one to five hours being required at room temperatures. After the reaction is complete, the mixture is poured into water and neutralized with a dilute base, such as dilute sodium or potassium hydroxide, or a bicarbonate such as sodium bicarbonate, potassium bicarbonate, or the like. The reaction mixture is then extracted in the usual manner, such as with methylene chloride, and the 2α - methyl - 6 - fluoro - 9α - halo - 11β,17α,21-trihydroxy-4-pregnene-3,20-dione 21-acylate (XI) recovered in a purified form by recrystallization or chromatography.

The 2α-methyl-6-fluoro-9α-halo-11β,17α,21-trihydroxy-4-pregnene-3,20-dione 21-acylate (XI), wherein the halogen is fluorine, bromine, or chlorine, is then hydrolyzed to the free 21-alcohol (XII) in accordance with known methods for hydrolyzing hydrocortisone 21-esters to free hydrocortisone. A preferred procedure is to employ at least a molar equivalent of an alkali metal bicarbonate, such as potassium bicarbonate, in a substantially oxygen-free solution of a mixture of a lower alkanol, such as methanol, and water. The hydrolysis reaction is normally conducted at temperatures between about ten and thirty degrees centigrade while protecting the mixture from atmospheric oxygen, generally by bubbling nitrogen continuously through the reaction mixture. After hydrolysis is complete, the mixture is neutralized with an acid such as acetic acid, dilute hydrochloric acid, or the like, and the hydrolyzed product recovered by evaporation and crystallization, extraction with methylene chloride, or by other conventional methods.

The step of hydrolysis can be followed by reesterfication of the 21-hydroxy group, as it is convenient to start with the 21-acetate as the 21-acylate and thus carry the 21-acetate through the synthesis steps. Esterification is carried out to produce the desired final 21-acylate using the appropriate anhydride or acid halide of an organic carboxylic acid containing from one to twelve carbon atoms, inclusive, preferably of a hydrocarbon carboxylic acid, under conventional 21-acylating conditions. The thus - produced 2α-methyl-6-fluoro-9α-halo-11β,17α,21-trihydroxy-4-pregnene-3,20-dione 21-acylate can be oxidized to the 11-keto compound (XIV) as described below.

The 2α - methyl - 6 - fluoro - 9α - halo - 11β,17α,21-trihydroxy-4-pregnene-3,20-dione (XII) can be oxidized to the corresponding 2α-methyl-6-fluoro-9α-halo-17α,21-dihydroxy-4-pregnene-3,11,20-trione (XIII) by methods which effect a selective oxidation at the 11-position, such as the procedure described in U.S. Patent 2,751,402. In accordance with the procedure therein described, selective oxidation is accomplished by reaction of the 11β-hydroxy steroid with an N-haloamide or N-haloimide such as N-bromoacetamide in a substantially nonreactive organic solvent containing an amine, preferably tertiary butyl alcohol as the solvent and pyridine as the amine.

Alternatively, the 2α-methyl-6-fluoro-9α-halo-11β,17α,21-trihydroxy-4-pregnene-3,20-dione 21-acylate (XI), instead of being hydrolyzed as indicated above, can be first oxidized to the corresponding 11-keto compound (XIV) by known methods for converting hydrocortisone acylates to cortisone acylates, such as by reaction with chromic acid. The thus-produced 2α-methyl-6-fluoro-9α-halo-17α,21-dihydroxy-4-pregnene-3,11,20-trione 21-acylate (XIV) can then be hydrolyzed as described above for the hydrolysis of the 11β-hydroxy-21-acylated steroid to yield 2α-methyl-6-fluoro-9α-halo-17α,21-dihydroxy-4-pregnene-3,11,20-trione (XIII).

The foregoing compounds VII through XIV are all characterized by the presence of a 6-fluoro substituent. It should be noted that the configuration of the fluorine at the 6-position can be either 6α or 6β. Thus substituting 2α - methyl - 6β - fluoro - 11β,17α,21 - trihydroxy - 4-pregnene-3,20-dione as the starting steroid (VII) and following the procedures hereinbefore described and as exemplified below, while maintaining near neutral reaction conditions, there is produced as the final product of each example the corresponding 6β-epimer. Where the 6β-epimer or mixtures predominating therein is employed as the starting material, any subsequent reaction product can be isolated either as the 6β-epimer or the aforesaid mixtures of 6α- and 6β-epimers, or a 6α-epimerized product can be obtained by treatment of the 6β-epimer or mixtures of the 6α- and 6β-epimers in an essentially anhydrous liquid medium with an anhydrous mineral acid, such as hydrochloric acid, in the presence of alcohol. For the most efficient epimerization, the 6β-product should be maintained below room temperatures, preferably below zero degrees centigrade, during the addition of the acid. The reaction mixture can then be washed with successive portions of dilute alkali and water and dried under reduced pressure. The corresponding 6α-product can then be purified by recrystallization.

GROUP C

The novel 6α-fluoro and 6β-fluoro steroid compounds of Group (C), of the present invention 2-methyl-6-fluoro - 9α - halo - 11 - oxygenated - 17α,21 - dihydroxy-1, 4-pregnadiene-3,20-diones and the 21-acylates thereof, for example, 2 - methyl - 6 - fluoro - 9α - halo - 11β,17α,21 - trihydroxy-1, 4-pregnadiene-3,20-diones and 2-methyl-6-fluoro - 9α - halo - 17α,21 - dihydroxy - 1,4 - pregnadiene-3,11,20-triones, and the 21-acylates thereof, are represented by the following formula:

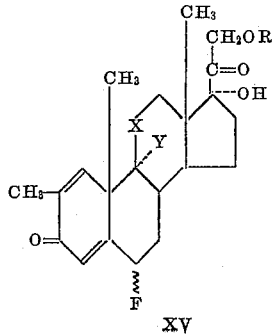

XV wherein X, R and Y have the meanings previously given.

The compounds of Group (C) of this invention can be prepared in accordance with the following reactions:

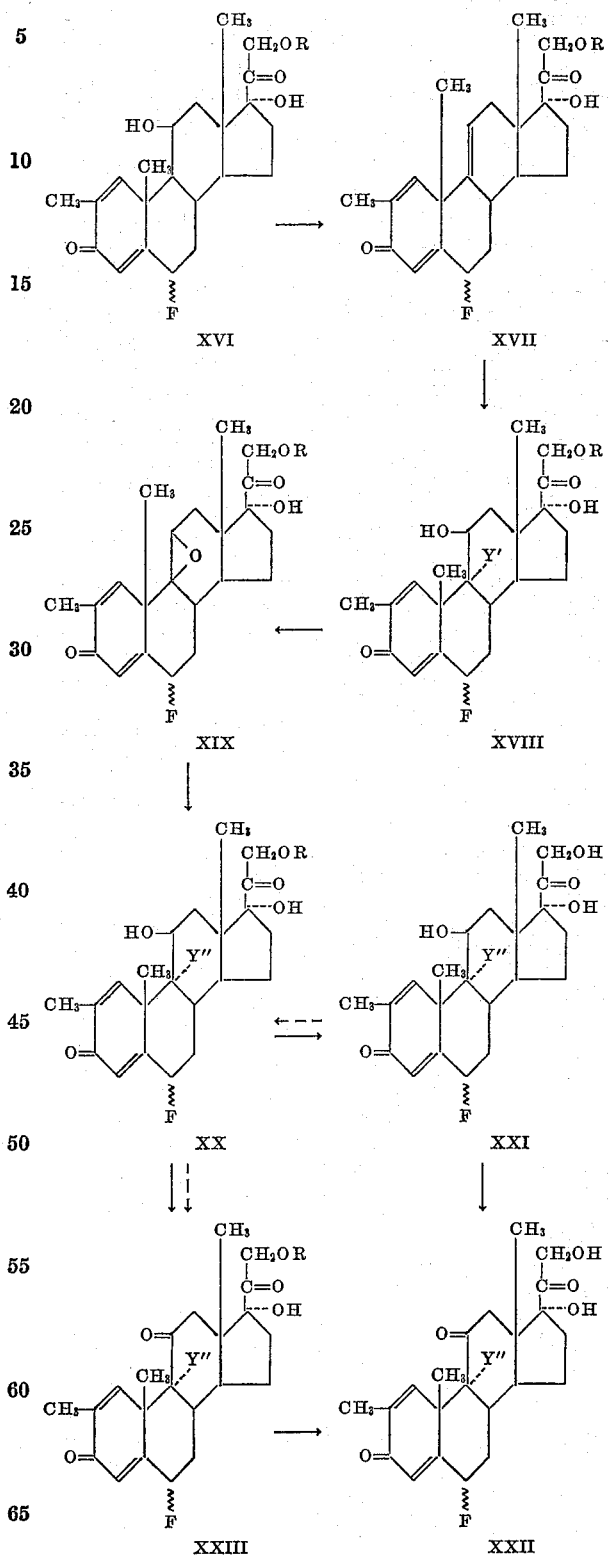

wherein R, Y′ and Y″ have the meanings previously given.

The process of preparing compounds of Group C is carried out in accordance with processes for preparing 9α-halohydrocortisone and generally comprises first the dehydration of 2-methyl-6-fluoro-11β,17α,21-trihydroxy-1,4-pregnadiene-3,20-dione 21-acylate to obtain 2-methyl-6 - fluoro - 17α,21-dihydroxy-1,4,9(11)-pregnatriene-3,20- dione 21-acylate, followed by treatment of the dehydration product with a source of hypohalous acid in which the halogen is bromine, chlorine, or iodine to produce the corresponding 2-methyl-6-fluoro-9α-halo-11β,17α,21-trihydroxy-1,4-pregnadiene-3,20-dione 21-acylate. The said 9α-halo compound is then epoxidized with a mild base to give 2-methyl-6-fluoro-9β,11β-oxido-17α,21-dihydroxy-1,4-pregnadiene-3,20-dione 21-acylate. Halogenation of the said 9,11-oxido compound, the halogenating agent being one which provides a source of fluorine, bromine or chlorine, gives the corresponding 2-methyl-6-fluoro - 9α - halo-11β,17α,21-trihydroxy-1,4-pregnadiene-3,20-dione 21-acylate. Upon hydrolysis of the said 9α-halo 21-acylate there is produced 2-methyl-6-fluoro-9α-halo - 11β,17α,21 - trihydroxy-1,4-pregnadiene-3,20-dione, which can be oxidized by known methods to produce the 2 - methyl-6-fluoro-9α-halo-17α,21-dihydroxy-1,4-pregnadiene-3,11,20-trione.

The starting steroids for the compounds and processes of Group (C) of the present invention are 2-methyl-6α-fluoro - 11β,17α,21-trihydroxy-1,4-pregnadiene-3,20-dione 21-acylate and 2-methyl-6β-fluoro-11β,17α,21-trihydroxy-1,4- pregnadiene-3,20-dione 21-acylate prepared in part (A), above.

In carrying out this novel process of this invention, 2-methyl-6-fluoro-11β,17α,21-trihydroxy-1,4-pregnadiene-3,20-dione 21-acylate (XVI) is dehydrated to the corresponding 21-acylate of 2-methyl-6-fluoro-17α,21-dihydroxy1,4,9(11)-pregnatriene-3,20-dione (XVII) by methods known in the art, e.g., by a dehydrating agent such as phosphorous oxychloride, thionyl chloride, hydrochloric acid or sulfuric acid and acetic acid or by pyrolysis as shown in U.S. Patents 2,640,838 and 2,640,839, or the dehydration can be effected by the preferred method of reacting the 2-methyl-6-fluoro-11β,17α,21-trihydroxy-1,4-pregnadiene-3,20-dione 21-acylate with a carboxylic acid N-haloamide or N-haloimide, wherein the halogen is bromine or chlorine, in an organic base together with anhydrous sulfur dioxide. Examples of such N-haloamides or N-haloimides are N-chloroacetamide, N-bromoacetamide, N-chlorosuccinimide, N-bromosuccinimide, 3 - bromo-5,5-dimethylhydantoin, 1,3-dibromo-5,5-dimethylhydantoin, and the like, N-bromoacetamide being preferred. The organic bases employed as solvents in the above reaction are generally tertiary amines wherein the amino nitrogen is a member of an aromatic ring, such as the pyridines and lower fatty amides, pyridine being preferred. Normally an amount in excess of a molar equivalent of organic base calculated on the basis of the quantity of starting steroid is employed. The sulfur dioxide is advantageously employed in substantially anhydrous form, inasmuch as the presence of water tends to decrease the yield of dehydrated product. The temperature of the reaction is generally between minus forty and plus seventy degrees centigrade, the lower limit being determined by the solubility of the substituents in the solvent selected and the upper limit by the amount of side reaction which normally accompanies reactions involving halogen compounds at higher temperatures. Ordinarily, room temperatures are preferred for convenience and because of the consistently high yields of end product which are obtained. A reaction time between about five minutes and three hours is usually employed, the specific temperature at which the reaction is conducted being determinative of the reaction time.

The thus obtained dehydration product is converted to 2 - methyl - 6 - fluoro-9α-halo-11β,17α,21-trihydroxy-1,4-pregnadiene-3,20-dione 21-acylate (XVIII) by reaction with a hypohalous acid. The hypohalous acid is usually produced in situ by reaction of an acid with an N-haloamide or N-haloimide wherein the halogen in bromine, chlorine or iodine. The 2-methyl-6-fluoro-17α,21-dihydroxy-1,4,9(11)-pregnatriene-3,20-dione 21-acylate is dissolved in an organic solvent such as methylene chloride, tertiary butyl alcohol, dioxane, tertiary amyl alcohol or the like, and reacted at room temperature with the hypohalous acid releasing agent, which includes N-bromoacetamide, N-chloroacetamide, N-bromosuccinimide, N-iodosuccinimide, N-chlorosuccinimide, and the like, in the presence of an acid such as perchloric acid, dilute sulfuric acid, and the like. N-bromoacetamide in tertiary butyl alcohol with perchloric acid and water are the preferred reagents for this reaction. Normally the halogenation is conducted at room temperatures, between fifteen and thirty degrees centigrade, although temperatures on either side of this range are operative. The reaction period may vary from about five minutes to one hour. At the conclusion of the desired reaction, the excess hypohalous acid is destroyed by the addition of sulfites or hydrosulfites, sodium sulfite being normally employed. The resulting 2-methyl-6-fluoro-9α-halo-11β,17α, 21 - trihydroxy - 1,4 - pregnadiene-3,20-dione 21-acylate (XVIII), in which the halogen is bromine, chlorine or iodine, can be isolated from the reaction mixture by adding an excess of water and extracting the product with organic solvents or by recovering the precipitated compound by filtration. The crude material (XVIII) can be employed directly in the next step of the process.

The 9α-halo compound (XVIII) as defined above is then epoxidized with a weak base, potassium acetate being preferred. The reaction is conducted in an inert solvent such as methanol, ethanol, acetone, and the like. The epoxidizing reaction takes place over a rather wide range of temperatures, normally from about minus fifteen degrees to the boiling point of the reaction mixture, the range between zero degrees and sixty degrees centigrade being most convenient. The reaction time may be carried considerably, depending on the temperatures employed, a period of reflux of from about eight to twenty hours producing satisfactory yields, with about eighteen hours usually being sufficient. The reaction mixture is concentrated, cooled and precipitated with water to give 2-methyl - 6 - fluoro - 9β,11β-oxido-17α,21-dihydroxy-1,4-pregnadiene-3,20-dione 21-acylate (XIX).

In the epoxide opening step, the 9,11-oxido compound (XIX) is reacted with an acid halide such as hydrogen fluoride, hydrogen chloride or hydrogen bromide, hydrogen fluoride being preferred, to produce the corresponding 2-methyl-6-fluoro - 9α - halo - 11β,17α,21 - trihydroxy - 1,4 - pregnadiene - 3,20 - dione 21 - acylate. The epoxide opening and halogenation is usually conducted at temperatures between about minus forty and plus fifty degrees centigrade, the preferred limits being between about zero and 25 degrees centigrade. Advantageously, the steroid is first dissolved in an organic solvent such as tetrahydrofuran, methylene chloride, and the like. In the course of the foregoing reaction, it is possible that some hydrolysis of the 21-acylate occurs, rendering the product somewhat difficult to recover by conventional methods, such as by chromatography. It is therefore preferable at the conclusion of the epoxide opening reaction to 21-acylate the product by methods commonly employed for acylating steroids, such as by treatment with the appropriate anhydride or acid halide of an organic carboxylic acid containing from one to twelve carbon atoms, inclusive, under conventional esterifying conditions. The halogenation reaction is operative at room temperatures but is preferably conducted at lower temperatures, such as zero to minus eighty degrees centigrade, with continuous stirring. The reaction time is usually from about one to 24 hours, with one to five hours being operative at room temperatures. After the reaction is completed, the mixture is poured into water and neutralized with a dilute base, such as dilute sodium or potassium hydroxide, or a bicarbonate such as sodium bicarbonate, potassium bicarbonate, or the like. The reaction mixture is then extracted in the usual manner, such as with methylene chloride, and the 2-methyl-6-fluoro-9α-halo-11β,17α,21-trihydroxy-1,4-pregnadiene-3,20-dione 21-acylate (XX) recovered in a purified form by recrystallization or chromatography.

The 2-methyl-6-fluoro-9α-halo-11β,17α,21-trihydroxy-1,4-pregnadiene-3,20-dione 21-acylate (XX), wherein the halogen is fluorine, bromine, or chlorine, can then be hydrolyzed to the free 21-alcohol (XXI) in accordance with known methods for hydrolyzing hydrocortisone 21-esters to free hydrocortisone. A preferred procedure is to employ at least a molar equivalent of an alkali metal bicarbonate, such as potassium bicarbonate, in a substantially oxygen-free solution of a mixture of a lower alkanol, such as methanol, and water. The hydrolysis reaction is normally conducted at temperatures between about ten and thirty degrees centigrade while protecting the mixture from atmospheric oxygen, generally by bubbling nitrogen continuously through the reaction mixture. After hydrolysis is complete, the mixture is neutralized with an acid such as acetic acid, dilute hydrochloric acid, or the like, and the hydrolyzed product recovered by evaporation and crystallization, extraction with a water-immiscible solvent such as methylene chloride, or by other conventional methods.

The step of hydrolysis can be followed by re-esterification of the 21-hydroxy group, as it is convenient to start with the 21-acetate as the 21-acylate and thus carry the 21-acetate through the synthesis steps. Esterification is carried out to produce the desired final 21-acylate using the appropriate anhydride or acid halide of an organic carboxylic acid containing from one to twelve carbon atoms, inclusive, preferably of a hydrocarbon carboxylic acid, under conventional 21-acylating conditions. The thus produced 2-methyl-6-fluoro-9α-halo-11β,17α,21-trihydroxy-1,4-pregnadiene-3,20-dione 21-acylate can be oxidized to the 11-keto compound (XXIII) as described below.

The 2-methyl-6-fluoro-9α-halo-11β,17α,21-trihydroxy-1,4-pregnadiene-3,20-dione (XXI) can be oxidized to the corresponding 2-methyl-6-fluoro-9α-halo-17α,21-dihydroxy-1,4-pregnadiene-3,11,20-trione (XXII) by methods which effect a selective oxidation at the 11-position, such as the procedure described in U.S. Patent 2,751,402. In accordance with the procedure therein described, selective oxidation is accomplished by reaction of the 11β-hydroxy steroid with an N-haloamide or N-haloimide such as N-bromoacetamide in a substantially nonreactive organic solvent containing an amine, preferably tertiary butyl alcohol as the solvent and pyridine as the amine.

Alternatively, the 2-methyl-6-fluoro-9α-halo-11β,17α,21-trihydroxy-1,4-pregnadiene-3,20-dione 21-acylate (XX), instead of being hydrolyzed as indicated above, can be first oxidized to the corresponding 11-keto compound (XXIII) by known methods for converting hydrocortisone acylates to cortisone acylates, such as by oxidation with chromic acid. The thus produced 2-methyl-6-fluoro-9α-halo-17α,21-dihydroxy-1,4-pregnadiene-3,11,20-trione 21-acylate (XXIII) can then be hydrolyzed as described above for the hydrolysis of the 11β-hydroxy-21-acylated steroid to yield 2-methyl-6-fluoro-9α-halo-17α,21-dihydroxy-1,4-pregnadiene-3,11,20-trione (XXII).

The foregoing compounds XVI through XXIII are all characterized by the presence of a 6-fluoro substituent. It should be noted that the configuration of the fluorine at the 6-position can be either 6α or 6β. Thus substituting 2-methyl-6β-fluoro-11β,17α,21-trihydroxy-1,4-pregnadiene-3,20-dione as the starting steroid (XVI) and following the procedures hereinbefore described and as exemplified below, while maintaining near neutral conditions, there is produced as the final product of each example the corresponding 6β-epimer. Where the 6β-epimer or mixtures predominating therein is employed as the starting material, any subsequent reaction product can be isolated either as the 6β-epimer or the afore-said mixtures of 6α and 6β epimers, or a 6α-epimerized product can be obtained by treatment of the 6β-epimer or mixtures of 6α and 6β epimers in an essentially anhydrous liquid medium with an anhydrous mineral acid, such as hydrogen chloride in the presence of alcohol. For the most efficient epimerization, the 6β-product should be maintained below room temperatures, preferably below zero degrees centigrade, during addition of the acid. The reaction mixture can then be washed with successive portions of dilute alkali and water and dried under reduced pressure. The corresponding 6α-product can then be purified by recrystallization.

GROUP D

The novel 6α-fluoro and 6β-fluoro steroid compounds of Group (D) of this invention, 2α-methyl-6-fluoro-11 oxygenated-17α-hydroxy-4-pregnene-3,20-diones and the corresponding 1-dehydro compounds, for example 2α methyl - 6 - fluoro-11β,17α-dihydroxy-4-pregnene - 3,20 dione, 2α - methyl - 6 - fluoro-17α-hydroxy-4-pregnene-3, 11,20-trione, 2 - methyl-6-fluoro-11β,17α-dihydroxy - 1,4 pregnadiene-3,20 - dione, and 2-methyl-6-fluoro-17α-hydroxy-1,4-pregnadiene-3,11,20-trione, are represented by the following formula:

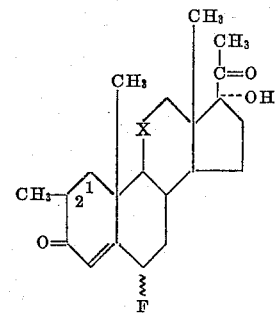

XXIV wherein X has the meanings previously given, and the 1,2 carbon atom linkage is selected from the linkages consisting of single bond and double bond linkages.

The novel compounds of Group (D) of the present invention can be prepared in accordance with the following reactions:

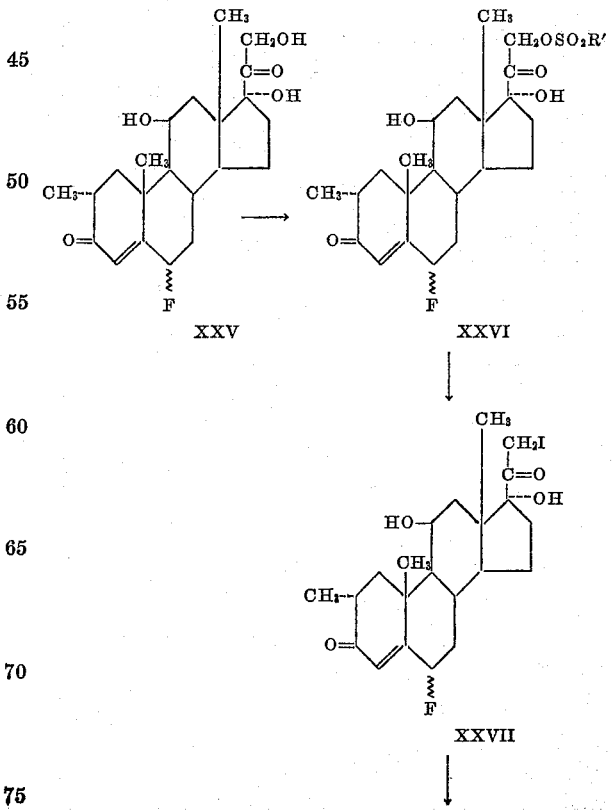

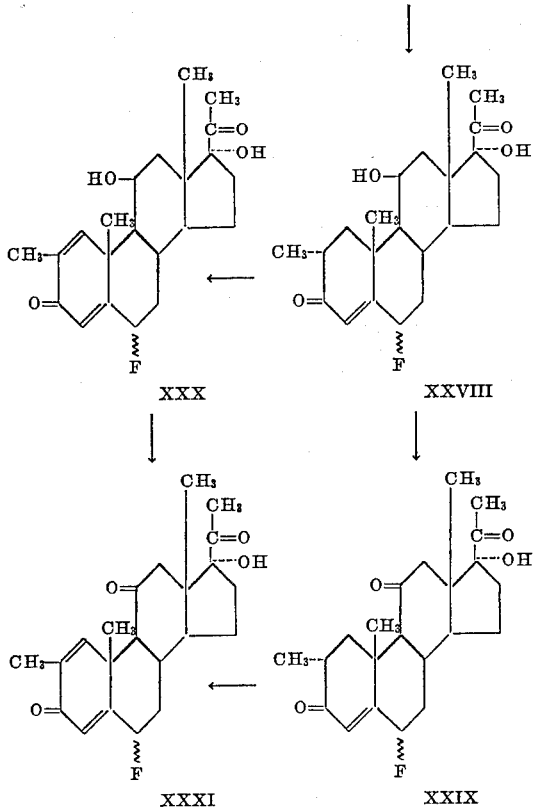

wherein R' is an organic radical, particularly a hydrocarbon radical containing from one to ten carbon atoms inclusive, such as methyl, ethyl, phenyl, tolyl, naphthyl, or the like, methyl being preferred.

In accordance with the present invention, a 2α-methyl-6-fluoro-11-oxygenated-17α,21-dihydroxy-4-pregnene-3,20-dione, for example 2α-methyl-6-fluoro-11β,17α,21-trihydroxy-4-pregnene-3,20-dione (XXV) is treated with an organic sulfonyl halide to obtain the corresponding 21-ester (XXVI), a 21-alkyl or aryl sulfonate of 2α-methyl-6-fluoro - 11β,17α,21 - trihydroxy-4-pregnene-3, 20-dione. The said 21-alkyl or aryl sulfonate is next reacted with an iodinating agent to obtain the corresponding 21-iodo steriod (XXVII), which is dehalogenated with a reducing agent to produce 2α-methyl-6-fluoro-11β,17α-dihydroxy-4-pregnene-3,20-dione (XXVIII). If desired, the 6-fluoro-21-desoxy product above can be oxidized to give 2α - methyl - 6 - fluoro-17α-hydroxy-4-pregnene-3,11, 20-trione (XXIX). Alternatively, the 11-keto compound, corresponding otherwise to the starting material can be employed to yield the product (XXIX), eliminating the oxidation step. In this alternative method, the intermediates corresponding to compounds (XXVI) and (XXVII) possess the 11-keto group instead of the 11-hydroxy group.

Similarly, substitution of the 11α-hydroxy compounds of the compounds of Formula XXV as starting material in the above reaction scheme produces the 11α-hydroxy compounds corresponding otherwise to the compounds of Formulae XXVI through XXVIII. These 11α-hydroxy compounds corresponding otherwise to Formula XXVIII can be oxidized in like manner to yield the products of Formula XXIX.

The selected 2α-methyl-6-fluoro-11β,17α - dihydroxy-4 pregnene-3,20-dione or 2α-methyl-6-fluoro-17α - hydroxy 4-pregnene-3,11,20-trione thus produced, is 1-dehydrogenated by fermentative or chemical dehydrogenation to produce the corresponding 2-methyl-6-fluoro-11β,17α - dihydroxy - 1,4-pregnadiene-3,20-dione (XXX), or the corresponding 2 - methyl-6-fluoro-17α-hydroxy-1,4-pregnadiene 3,11,20-trione (XXXI). In like manner, substitution of the 11α-analogues of the compounds of Formula XXVIII as starting material in the 1-dehydrogenation reactions is productive of the 11α-compounds corresponding otherwise to the compounds of Formula (XXX).

The starting materials for Group (D) of the present invention are the 2α-methyl-6-fluoro-11-oxygenated-17α, 21-dihydroxy-4-pregnene-3,20-diones, for example, 2α-methyl-6α-fluoro-11β,17α,21 - trihydroxy - 4-pregnene 3,20-dione, 2α - methyl-6β - fluoro-11β,17α,21-trihydroxy-4-pregnene 3,20-dione, 2α-methyl-6α - fluoro - 17α,21 - dihydroxy-4-pregnene-3, 11,20-trione, and 2α - methyl - 6β - fluoro-17α,21-dihydroxy-4-pregnene-3, 11,20-trione, prepared in accordance with the procedures disclosed in copending application Serial No. 699,508 filed November 29, 1957, and Preparation 1 described below.

In carrying out the process of this invention, 2α-methyl 6 - fluoro - 11β,17α, 21-trihydroxy-4-pregnene-3,20-dione (XXV) is treated with an organic sulfonyl halide such as methanesulfonyl chloride, toluenesulfonyl chloride, toluenesulfonyl bromide, benzenesulfonyl chloride, naphthylsulfonyl chloride, or the like, the methanesulfonic acid halides, especially methanesulfonyl chloride, being preferred. In the preferred embodiment of this invention, the starting steriod is reacted with the alkyl or aryl sulfonyl halide in solution in a solvent such as pyridine, benzene, toluene, or the like. Where such solvents as benzene and toluene are employed, an amount of amine base such as pyridine at least equal to the molar amount of the sulfonyl halide should also be present to react with the halogen acid formed. Reaction of the alkyl or aryl sulfonyl halide is conducted preferably at a temperature between minus ten and plus sixty degrees centigrade, provided that at the lower temperature the solvent has not solidified. Thus, for pyridine, dioxane, toluene or the like, temperatures in the range of zero to ten degrees centigrade can be used, while for benzene only temperatures above five degrees centigrade are suitable because of the relatively high melting point of benzene. The reaction time is usually between about thirty minutes and 24 hours, after which the product, 2α-methyl-6 - fluoro 11β,17α,21-trihydroxy-4-pregnene-3,20-dione 21-alkyl or aryl sulfonate (XXVI), is recovered in a conventional manner, such as, for example, by evaporating the solvent until a solid residue is obtained or by diluting the reaction mixture with water and precipitating the product with dilute hydrochloric acid.

The 21-iodo compound (XXVII) is prepared by reacting the said 21-alkyl or aryl sulfonate with an iodinating agent such as an alkali metal iodide, e.g., sodium, potassium or lithium iodide in an oxygenated hydrocarbon solution, e.g., an alkanone solution such as acetone. A molar excess of the iodide (three to twenty moles of iodide per mole of steroid) is generally preferred for this reaction. The reaction mixture containing the 21-alkyl or aryl sulfonate and the alkali metal iodide in solution is heated to reflux for a period of about three to thirty minutes. The thus produced 2α-methyl-6-fluoro-21-iodo 11β,17α-dihydroxy-4-pregnene-3,20 - dione (XXVII) can then be isolated by evaporating the solvent. For the subsequent reaction, the 21-iodo compound can be used either in purified form as a product of recrystallization from such organic solvents as acetone, ethanol, or the like, or it can be employed directly as a crude product in the next step of the synthesis.

The 2α - methyl - 6 - fluoro - 11β,17α-dihydroxy-21-iodo 4-pregnene-3,20-dione is dehalogenated at the 21-position by reaction with a reducing agent such as sodium or potassium thiosulfate, bisulfite or sulfite, or zinc and acetic acid, or the like. In the preferred embodiment of the invention, the crude 21-iodide is slurried with zinc and acetic acid and the mixture stirred at room temperature for a period of five minutes to two hours. After dilution with water, the product is isolated from the reaction mixture by conventional methods, such as by filtration or extraction with a water-immiscible organic solvent, e.g., ether, benzene, methylene chloride, ethylene chloride, carbon tetrachloride, chloroform, hexane, heptane, or the like, and evaporating the solvent therefrom. Purification of the thus obtained 2α-methyl-6-fluoro-11β,17α - dihydroxy-4-pregnene-3,20-dione (XXVIII) can be carried out in the usual manner, such as by recrystallization from ether, acetone, methanol, ethanol, Skellysolve B (brand of hexane hydrocarbons) or the like, or by chromatography.

The foregoing procedures can likewise be conducted on the 11α-hydroxy and the 11-keto compounds corresponding to each of the starting materials therein.

The oxidation of 20α-methyl - 6 - fluoro-11β,17α-dihydroxy-4-pregnene-3,20-dione can be carried out by a variety of methods, such as, for example, by oxidizing the said 2α-methyl-6-fluoro-21-desoxy steroid in acetic acid solution with chromium trioxide, using molar quantities or a slight excess, or employing a haloamide or haloimide of an acid such as N-bromoacetamide, N-chlorosuccinimide, or N - bromosuccinimide in pyridine, dioxane, or other solvent solutions. After conclusion of the desired oxidation, the oxidant is generally destroyed by addition of methyl alcohol, ethyl alcohol, or the like when chromic acid is the oxidizing agent, and an alkali bisulfite when N-bromosuccinimide or other N-haloacylimides or amides are used. Thereafter, 2α-methyl-6-fluoro-17α-hydroxy-4-pregnene-3,11,20-trione (XXIX) is recovered by conventional means, such as extraction with water-immiscible solvents, e.g., methylene chloride, ethylene chloride, chloroform, carbon tetrachloride, ether, benzene, toluene and the like, or by chromatography.

In like manner, substitution of 2α-methyl-6-fluoro-11α,17α-dihydroxy-4-pregnene-3,20-dione as starting material in the oxidation reaction is productive of 2α-methyl - 6 fluoro-17α-hydroxy-4-pregnene-3,11,20-trione.

The dehydrogenation of the selected 2α-methyl-6-fluoro-11-oxygenated-17α-hydroxy-4-pregnene-3,20-dione for example 2α-methyl - 6 - fluoro-11β,17α-hydroxypregnene-3,20-dione (XXVIII), and 2α-methyl-6-fluoro-17α-hydroxy-4-pregnene-3,11,20-trione (XXIX) to obtain the corresponding 1-dehydro compounds for example 2-methyl-6 fluoro-11β,17α-dihydroxy - 1,4-pregnadiene-3,20 - dione (XXX) and 2-methyl-6-fluoro-17α-hydroxy-1,4 - pregnadiene-3,11,20-trione (XXXI) can be carried out by fermentative or chemical dehydrogenation. Microorganisms such as, for example, Septomyxa, Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used under fermentation conditions well known in the art (e.g., U.S. 2,602,769) and furthermore illustrated by Examples 8D and 9D herein.

When Septomyxa is used to effect the dehydrogenation of the compounds of Formula XXVIII it is advantageous to use with the substrate and medium a steriod promoter, such as, progesterone, 3-ketobisnor-4-cholen-22-al, 3-ketobisnorcholenic acid, 11β,21-dihydroxy,1,4,17(20)-pregnatrien-3-one, and the like.

The chemical dehydration can be carried out with selenium dioxide according to known procedures [e.g., Meystre et al., Helv. Chim. Acta, 39, 734 (1956)].

In the foregoing processes, it should be understood that either the 6α-fluoro epimer or the 6β-fluoro epimer can be utilized at any stage. The 6α-epimer can be obtained at appropriate intermediate stages by treatment of the 6β-compound, at temperatures of zero degrees centigrade or slightly lower and in an organic solvent such as chloroform, with an anhydrous mineral acid, such as hydrochloric acid, in the presence of alcohol. Such temperatures should be maintained throughout the period of addition of the acid. The reaction mixture can then be washed with successive portions of dilute alkali and water and evaporated under reduced pressure to obtain the 6α-epimer in high yield.

GROUP E

The novel 6α-fluoro and 6β-fluoro steroid compounds of Group (E) of this invention, 2α-metyl-6,21-difluoro 11-oxygenated-17α-hydroxy-4-pregnene-3,20 - diones and the corresponding 1-dehydro compounds, for example, 2α-methyl - 6,21 - difluoro-11β,17α-dihydroxy-4-pregnene 3,20-dione, 2α - methyl - 6,21 - difluoro - 17α-hydroxy-4-pregnene-3, 11,20-trione, 2 - methyl - 6,21-difluoro-11β,17α - dihydroxy-1,4-pregnadiene-3,20-dione, and 2-methyl - 6,21 - difluoro - 17α - hydroxy-1,4-pregnadiene 3,11,20-trione are represented by the following formula:

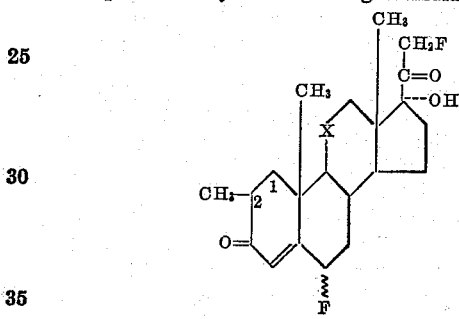

XXXII wherein X has the meaning previously given and the 1,2-carbon atom linkage is selected from the linkages consisting of single bond and double bond linkages.

The novel compounds of Group (E) of the present invention can be prepared in accordance with the following reactions:

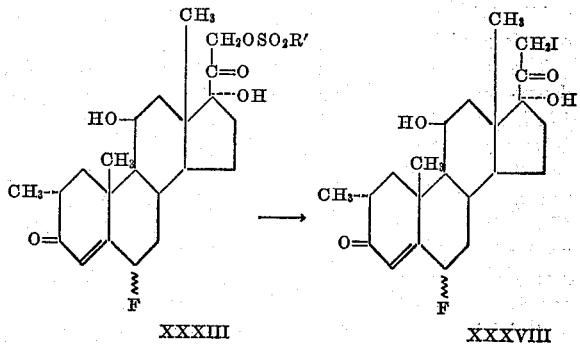

XXXIII    XXXVIII

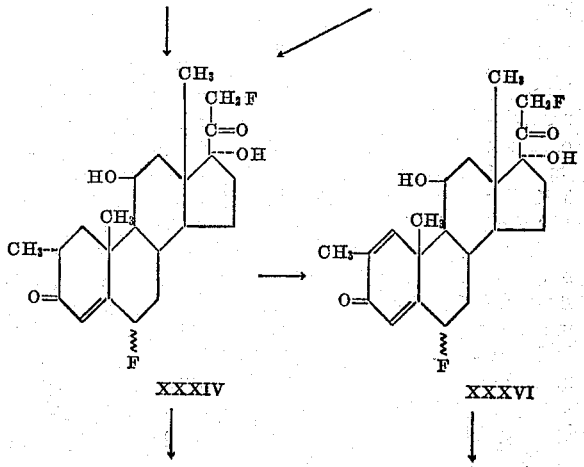

XXXIV    XXXVI

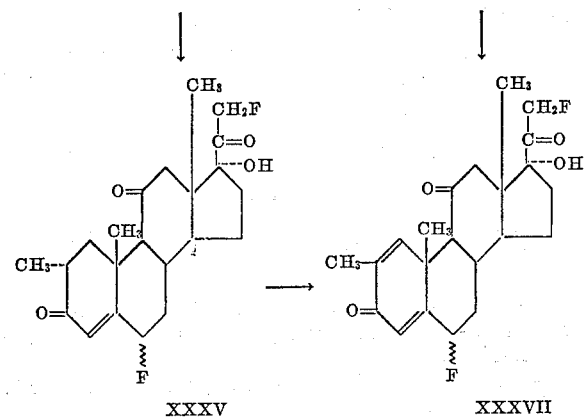

wherein R' has the meanings previously given.

The process of Group (E) of this invention comprises treating a 21-alkyl or aryl sulfonate of 2α-methyl-6-fluoro 11-oxygenated-17α,21-dihydroxy - 4 - pregnene-3,20-dione, for example, a 21-alkyl or aryl sulfonate of 2α-methyl-6-fluoro-11β,17α,21-trihydroxy - 4 - pregnene-3,20-dione (XXXIII) with a fluorinating agent to obtain the corresponding 2α-methyl-6,21-difluoro-11β,17α - dihydroxy-4-pregnene-3,20-dione (XXXIV). If desired, the 2α-methyl-6,21-difluoro product above can be oxidized to give the corresponding 2α-methyl-6,21-difluoro-17α-hydroxy-4-pregnene-3,11,20-trione (XXXV). Alternatively, 2α - methyl - 6 - fluoro-11β,17α dihydroxy-21-iodo-4 pregnene-3,20-dione (XXXVIII) can be fluorinated to yield the 21-fluoro steroid (XXXIV). If the 11-keto compound corresponding otherwise to the compound of Formula XXXIII is employed, the product (XXXV) is obtained without the oxidation step.

Similarly, substitution of the 11α-hydroxy compounds corresponding otherwise to Formulae XXXIII and XXXVIII as starting material in the above reaction scheme produces the 11α-hydroxy compounds corresponding otherwise to Formula XXXIV which can be oxidized in the same manner as the 11β-hydroxy compounds to yield the products of Formula XXXV.

The selected 2α-methyl - 6,21-difluoro-11β,17α-dihydroxy-4-pregnene-3,20-dione or 2α-methyl-6,21-difluoro 17α-hydroxy-4-pregnene-3,11,20-trione thus produced, is 1-dehydrogenated by fermentative or chemical dehydrogenation to produce the corresponding 2-methyl-6,21-difluoro-11β,17α-dihydroxy-1,4-pregnadiene - 3,20 - dione (XXXVI), or 2-methyl-6,21-difluoro-17α - hydroxy - 1,4 pregnadiene-3,11,20 - trione (XXXVII). In the same manner, substitution of the 11α - hydroxy compounds corresponding otherwise to Formula XXXIV as starting material in the 1-dehydrogenation reactions is productive of the 11α-hydroxy compounds corresponding otherwise to Formula XXXVI.

The starting materials for Group (E) of the present invention include the 21-alkyl or aryl sulfonates of 2α methyl - 6 - fluoro-11-oxygenated-17α,21-dihydroxy - 4 pregnene-3,20-diones (XXXIII) or the 2α - methyl - 6 fluoro-11-oxygenated-17α - hydroxy - 21-iodo-4-pregnene 3,20-diones (XXXVIII) for example 2α-methyl-6α-fluoro-11β,17α,21-trihydroxy-4-pregnene-3,20-dione 21-methanesulfonate, 2α-methyl-6β,fluoro-11β,17α,21-trihydroxy - 4 pregnene-3,20-dione 21-methanesulfonate, 2α-methyl - 6α fluoro-17α,21-dihydroxy-4-pregnene - 3,11,20 - trione 21 methanesulfonate, 2α-methyl - 6β - fluoro - 17α, 21-dihydroxy - 4 - pregnene-3,11,20-trione 21-methanesulfonate, 2α-methyl-6α-fluoro - 11β, 17α-dihydroxy 21 - iodo 4-pregnene-3,20 dione, 2α-methyl-6β-fluoro - 11β,17α-dihydroxy-21-iodo-4-pregnene-3,20-dione, 2α - methyl - 6α fluoro-17α-hydroxy - 21 - iodo - 4 - pregnene-3,11,20-trione and 2α-methyl - 6β - fluoro-17α-hydroxy-21-iodo - 4 pregnene-3,11,20-trione prepared in Group (D), above, and represented in Group (D) by Formulae XXVI and XXVII.

In carrying out the process of the present invention, 2α - methyl - 6 - fluoro - 11-oxygenated - 17α,21-dihydroxy-4-pregnene-3,20-dione 21-alkyl or aryl sulfonate, for example 2α-methyl-6-fluoro-11β,17α,21-trihydroxy-4-pregnene-3,20-dione 21-alkyl or aryl sulfonate (XXXIII) is treated with a fluorinating agent such as potassium fluoride, silver fluoride or antimony fluoride in an inert solvent such as dimethylsulfoxide, acetonitrile, dimethylformamide or ethylene glycol solution, the preferred combination being potassium fluoride in dimethylsulfoxide. The reaction is advantageously conducted under continuous heating, and it proceeds generally for a period of about six to 24 hours, fifteen to twenty hours usually being sufficient. The reaction mixture is then diluted with an organic solvent such as methylene chloride, chloroform, benzene, and the like, and purified in a conventional manner, as, for example, by chromatography or solvent extraction to give the corresponding 2α-methyl-6,21-difluoro - 11 - oxygenated - 17α - hydroxy - 4 - pregnene-3,20-dione, for example, 2α-methyl-6,21-difluoro-11β,17α-dihydroxy-4-pregnene-3,20-dione (XXXIV).

Alternatively, a 2α-methyl-6-fluoro-11-oxygenated-17α-hydroxy-21-iodo-4-pregnene-3,20-dione, for example, 2α-methyl - 6 - fluoro - 11β,17α-dihydroxy-21-iodo-4-pregnene-3,20-dione (XXXVIII), dissolved in a solvent such as acetonitrile, dimethylformamide or ethylene glycol is treated with a metal fluoride such as silver fluoride, antimony fluoride, potassium fluoride, or the like, acetonitrile and silver fluoride being preferred. The metal fluoride should be added in small quantities at intervals, and the reaction mixture should be protected from light during the reaction period, which usually ranges from about one-half to six hours. The reaction mixture is then concentrated and the product extracted as in previous purification steps to yield the corresponding 6,21-difluoro steroid, for example, 2α - methyl - 6,21 - difluoro-11β,17α-dihydroxy-4-pregnene-3,20-dione (XXXIV).

The foregoing reactions constituting either the principal or alternative routes can likewise be conducted on the corresponding 11-keto compounds, and the corresponding 11α-hydroxy compounds.

The oxidation of 2α-methyl-6,21-difluoro-11β,17α-dihydroxy-4-pregnene-3,20-dione (XXXIV) can be carried out by known methods, such as, for example, by oxidizing the said 6,21-difluoro steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the oxidation reaction, the oxidant is generally destroyed by addition of methyl alcohol, ethyl alcohol, and the like for the chromic acid oxidant or a bisulfite for N-bromoacetamide, N-bromosuccinimide and other N-halo acyl amides and imides. Thereafter, the resulting 2α-methyl-6,21-difluoro-17α-hydroxy-4-pregnene-3,11,20-trione (XXXV) is recovered by conventional means, such as by extraction with water-immiscible solvents, e.g., methylene chloride, ether, benzene, toluene or the like, or by chromatography.

In the same manner, substitution of 2α-methyl-6,21-difluoro-11α,17α-dihydroxy-4-pregnene-3,20-dione as starting material in the oxidation reaction is productive of 2α - methyl-6,21-difluoro-17α-hydroxy-4-pregnene-3,11,20-trione.

The dehydrogenation of the selected 2α-methyl-6,21-difluoro - 11 - oxygenated - 17α - hydroxy - 4 - pregnene-3,20-dione, for example 2α-methyl-6,21-difluoro-11β,17α- hydroxy-4-pregnene-3,20-dione (XXXIV), or 2α-methyl-6,21 - fluoro - 17α - hydroxy-4-pregnene-3,11,20-trione (XXXV) to obtain the corresponding 1-dehydro compounds, for example 2-methyl-6,21-difluoro-11β,17α-dihydroxy-1,4-pregnadiene-3,20-dione (XXXVI) and 2-methyl-6,21 - difluoro-17α-hydroxy-1,4-pregnadiene-3,11,20-trione (XXXVII), can be carried out by fermentative or chemical dehydrogenation. Microorganisms such as, for example, Septomyxa, Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used under fermentation conditions well known in the art (e.g., U.S. 2,602,769) and furthermore illustrated by Examples 4E and 5E herein.

When 2α - methyl - 6,21 - difluoro-11β,17α-dihydroxy-4-pregnene-3,20-dione and 2α-methyl-6,21-difluoro-11α,17α-dihydroxy-4-pregnene-3,20-dione are the starting materials and Septomyxa is used to effect the 1-dehydrogenation is is advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatrien-3-one, and the like.

The chemical dehydrogenation can be carried out with selenium dioxide according to known procedures [e.g., Meystre et al., Helv. Chim. Acta 39, 734 (1956)].

In the foregoing processes, it should be understood that the corresponding 6β-fluoro epimer can be utilized at any stage and the 6α-epimer obtained at appropriate intermediate stages by treatment of the 6β-compound in an organic solvent such as chloroform, at temperatures of zero degrees centigrade or slightly lower, with an anhydrous mineral acid, such as hydrochloric acid, in the presence of alcohol. Such temperatures should be maintained throughout the period of addition of the acid. The reaction mixture can then be washed with successive portions of dilute alkali and water and evaporated under reduced pressure to obtain the 6α-epimer.

The novel 6α-fluoro and 6β-fluoro steroid compounds of Group (F) of this invention, 2α-methyl-6-fluoro-9α-halo - 11 - oxygenated - 17α - hydroxy - 4 - pregnene - 3, 20-diones and the corresponding 1-dehydro compounds, for example, 2α-methyl-6-fluoro-9α-halo-11β,17α-dihydroxy - 4 - pregnene - 3,20 - dione, 2α-methyl-6-fluoro-9α - halo - 17α - hydroxy - 4 - pregnene - 3,11,20 -trione, 2 - methyl - 6 - fluoro - 9α - halo - 11β,17α - dihydroxy-1,4 - pregnadiene - 3,20 - dione, and 2 - methyl - 6 - fluoro - 9α - halo - 17α - hydroxy - 1,4 - pregnadiene - 3,11, 20-trione are represented by the following formula:

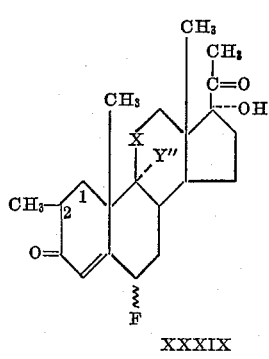

XXXIX wherein X and Y″ have the meanings previously given, and the 1,2-carbon atom linkage is selected from the linkages consisting of single bond and double bond linkages.

The novel compounds of Group (F) of this invention can be prepared in accordance with the following reactions:

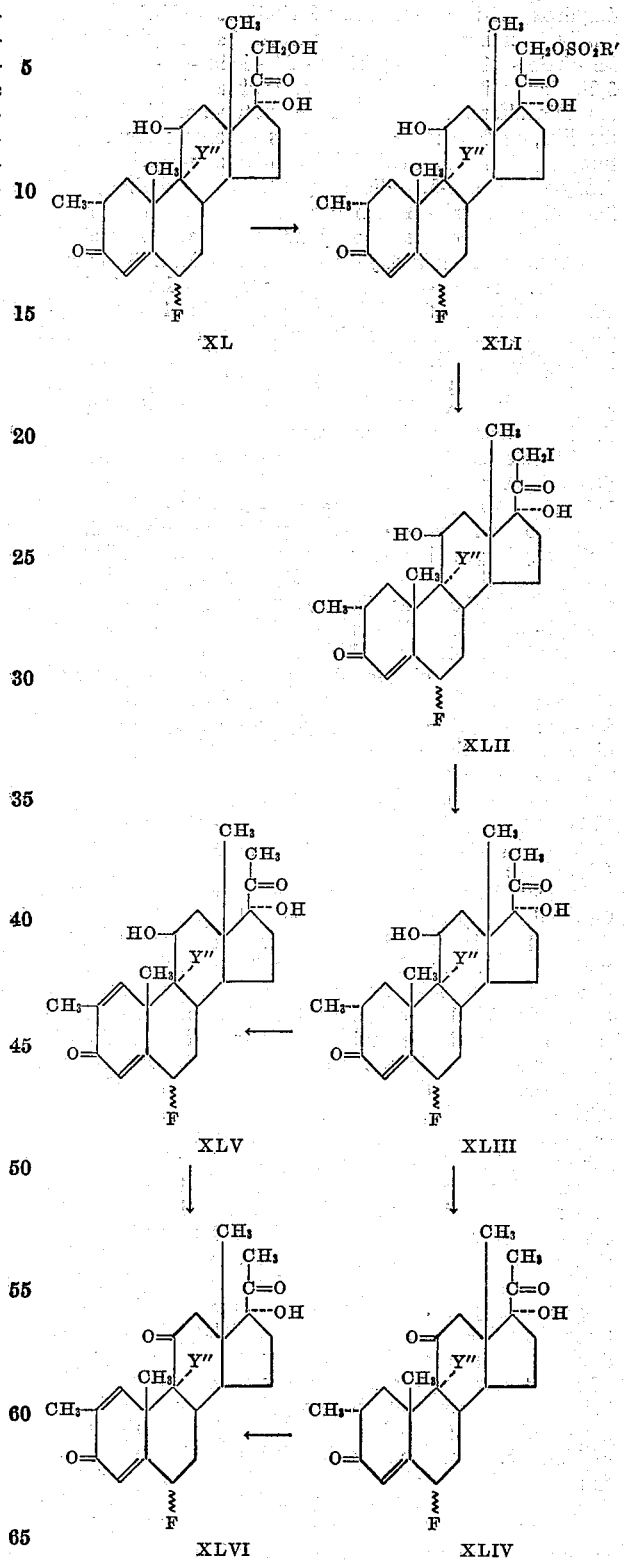

wherein Y″ and R′ have the meanings previously given.

The process of Group (F) of the present invention comprises treating a 2α-methyl-6-fluoro-9α-halo-11β,17α, 21-trihydroxy-4-pregnene-3,20-dione (XL) with an organic sulfonyl halide to obtain the corresponding 21-ester (XLI), and 21-alkyl or aryl sulfonate of 2α-methyl-6-fluoro - 9α - halo - 11β,17α,21-trihydroxy-4-pregnene-3, 20-dione, and thereafter treating the thus produced 21-alkyl or aryl sulfonate with an iodinating agent, such as sodium iodide in acetone solution, to obtain the corresponding 2α - methyl - 6 - fluoro - 9α - halo - 11β,17α-dihydroxy-21-iodo-4-pregnene-3,20-dione (XLII) and, finally, treating the thus produced 2α-methyl-6-fluoro-9α - halo - 11β,17α-dihydroxy - 21 - iodo - 4 - pregnene-3,20-dione with a reducing agent, such as zinc dust, sodium thiosulfate, sodium bisulfite, potassium bisulfite, or the like, preferably in an aqueous organic solvent mixture, to obtain 2α-methyl-6-fluoro-9α-halo-11β,17α-dihydroxy-4-pregnene-3,20-dione (XLIII). If desired, the 2α-methyl-6-fluoro-9α-halo product XLIII above can be oxidized to give the corresponding 2α-methyl-6-fluoro-9α - halo - 17α - hydroxy - 4 - pregnene - 3,11,20 - trione (XLIV). Moreover, when the corresponding 11-keto compound (2α-methyl-6-fluoro-9α-halo-17α,21-dihydroxy-4-pregnene-3,11,20-trione) is utilized as starting material in the above series of reactions, 2α-methyl-6- fluoro-9α-halo-17α-hydroxy-4-pregnene-3,11,20-trione (XLIV) is produced directly without the necessity for oxidation of the 11β-hydroxyl as the final step.

The selected 2α-methyl-6-fluoro-9α-halo-11β,17α-dihydroxy-4-pregnene-3,20-dione or 2α-methyl-6-fluoro-9α-halo 17α - hydroxy - 4 - pregnene - 3,11,20 - trione thus produced, is 1-dehydrogenated by fermentative or chemical dehydrogenation to produce the corresponding 2-methyl - 6 - fluoro - 9α - halo - 11β,17α - dihydroxy - 1,4-pregnadiene-3,20-dione (XLV), or the corresponding 2-methyl - 6 - fluoro - 9α - halo - 17α - hydroxy - 1,4 - pregnadiene-3,11,20-trione (XLVI).

The starting steroids for the compounds and process of Group (F) of this invention include 2α-methyl-6α-fluoro-9α - halo - 11β,17α,21 - trihydroxy - 4 - pregnene - 3,20-dione, 2α - methyl - 6β - fluoro - 9α - halo - 11β,17α,21-trihydroxy - 4 - pregnene - 3,20 - dione, 2α - methyl - 6α-fluoro - 9α - halo - 17α,21 - dihydroxy - 4 - pregnene-3,11,20-trione, and 2α-methyl-6β-fluoro-9α-halo-17α,21-dihydroxy-4-pregnene-3,11,20-trione prepared in Group (B), above.

In accordance with this invention, 2α-methyl-6-fluoro-9α - halo - 11β,17α,21-trihydroxy - 4 - pregnene - 3,20-dione (XL) is treated with an organic sulfonyl halide such as methanesulfonyl chloride, toluenesulfonyl chloride, toluenesulfonyl bromide, benzenesulfonyl chloride, naphthylsulfonyl chloride, or the like, the methanesulfonyl acid halides, especially methanesulfonyl chloride, being preferred. In the preferred embodiment of this invention, the starting steroid is usually reacted with the alkyl or aryl sulfonyl halide in solution in a solvent such as pyridine, benzene, toluene, or the like. Where such solvents as benzene and toluene are employed, an amount of an amine base such as pyridine at least equal to the molar amount of the sulfonyl halide should also be present to react with the hydrochloric acid formed. Reaction of the alkyl or aryl sulfonyl halide is conducted preferably at temperatures between minus ten and plus sixty degrees centigrade, provided that at the lower temperatures the solvent has not solidified. Thus, for pyridine, dioxane, toluene, or the like, temperatures in the range of zero to ten degrees centigrade can be used, while for benzene only temperatures above five degrees centigrade are suitable because of the relatively high freezing point of benzene. The reaction time is usually between about four to 24 hours, after which the product, 2α-methyl-6-fluoro - 9α - halo - 11β,17α,21 - trihydroxy - 4 - pregnene-3,20-dione 21-alkyl or aryl sulfonate (XLI), is recovered in a conventional manner, such as, for example, by evaporating the solvent until a solid residue is obtained or by diluting the reaction mixture with water and precipitating the product with dilute hydrochloric acid.

The 2α-methyl-6-fluoro-9α-halo-11β,17α,21-trihydroxy-4-pregnene-3,20-dione 21-alkyl or aryl sulfonate is converted to the corresponding 21-iodo compound (XLII) by reacting the said 21-alkyl or aryl sulfonate with an iodinating agent, such as an alkali metal iodide, e.g., sodium, potassium or lithium iodide, in an oxygenated hydrocarbon solution such as an alkanone solution, e.g., acetone. A molar excess of the iodide (three to twenty moles of iodide per mole of steroid) is generally preferred for this reaction. The reaction mixture containing the 21-alkyl or aryl sulfonate and the alkali metal iodide in solution is heated to reflux for a period of about three minutes to thirty minutes. The thus produced 2α-methyl-6 - fluoro - 9α - halo - 21 - iodo - 11β,17α - dihydroxy - 4-pregnene-3,20-dione can then be isolated by evaporating the solvent. For the subsequent reaction, the 21-iodo steroid can be used either in purified form as a product of recrystallization from such organic solvents as acetone, ethanol, or the like, or it can be employed directly as a crude product in the next step of the synthesis.

In order to obtain 2α-methyl-6-fluoro-9α-halo-11β,17α-dihydroxy-4-pregnene-3,20-dione (XLIII), the crude 2α-methyl - 6 - fluoro - 9α - halo - 11β,17α - dihydroxy - 21-iodo-4-pregnene-3,20-dione is reacted with a reducing agent such as sodium or potassium thiosulfate, sodium bisulfite or zinc dust in acetic acid. In the preferred embodiment of the invention the 21-iodo compound is dissolved in acetic acid at room temperature and stirred from about thirty minutes to one hour. Excess aqueous sodium thiosulfate is added, followed by ice and water. The time of reaction is not critical and is generally between a few minutes and several hours. The amount of sodium thiosulfate may be varied so long as an excess is used. The product, 2α-methyl-6-fluoro-9α-halo-11β,17α-dihydroxy-4-pregnene-3,20-dione, is obtained by conventional means such as recrystallization or extraction and thereafter recrystallization or chromatography as deemed necessary.

The foregoing reactions can likewise be conducted on the corresponding 11-keto compounds.

The oxidation of 2α-methyl-6-fluoro-9α-halo-11β,17α-dihydroxy-4-pregnene-3,20-dione (XLIII) can be carried out by a variety of methods, such as, for example, by oxidizing the said 2α-methyl-6-fluoro-9α-halo-11β-hydroxy steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by the addition of methyl alcohol, ethyl alcohol, and the like for the chromic acid oxidant, or a bisulfite for N-bromoacetamide, N-bromosuccinimide and other N-halo acyl amides and imides. Thereafter, the resulting 2α-methyl-6-fluoro-9α-halo-17α-hydroxy-4-pregnene-3,11,20-trione (XLIV) is recovered by conventional means, such as by extraction with water-immiscible solvents, e.g., methylene chloride, ether, benzene, toluene or the like, or by chromatography.

The dehydrogenation of the selected 2α-methyl-6-fluoro - 9α - halo - 11β,17α - dihydroxy - 4 - pregnene-3,20-dione (XLIII), or 2α-methyl-6-fluoro-9α-halo-17α-hydroxy-4-pregnene-3,11,20-trione (XLIV) to obtain the corresponding 1-dehydro compounds 2-methyl-6-fluoro-9α - halo - 11β,17α - dihydroxy - 1,4 - pregnadiene - 3,20-dione (XLV) and 2-methyl-6-fluoro-9α-halo-17α-hydroxy-1,4-pregnadiene-3,11,20-trione (XLVI) can be carried out by fermentative or chemical dehydrogenation. Microorganisms such as, for example, Septomyxa, Corynebacterium, Didymella, Calonectria, Alternaria, Colletotrichum, Cylindrocarpon, Ophiobolus, Fusarium, Listeria, Erysipelothrix, Mycobacterium, Trichothecium, Leptosphaeria, Cucurbitaria, Nocardia, and enzymes of fungi of the family Tuberculariaceae can be used under fermentation conditions well known in the art (e.g., U.S. 2,602,769) and furthermore illustrated by Examples 6F and 7F herein.

When Septomyxa is used to effect the dehydrogenation of the compounds of Formula XLIII it is advantageous to use with the substrate and medium a steroid promotor, such as, progesterone, 3-ketobisnor-4-cholen-22-al, 3-ketobisnorcholenic acid, 11β,21-dihydroxy-1,4,17(20)-pregnatrien-3-one, and the like.

The chemical dehydration can be carried out with selenium dioxide according to known procedures [e.g., Meystre et al., Helv. Chim. Acta 39, 734 (1956)].

Alternatively, if desired, removal of the oxygen at carbon atom 21 can be accomplished first, and this can be followed by halogenation at carbon atom 9. For example 2α - methyl - 6 - fluoro - 11β,17α - dihydroxy - 4 - pregnen-3,20-dione prepared in group (D), above, can be dehydrated with N-bromoacetamide and anhydrous sulfur dioxide in pyridine solution by permitting the reaction to continue until a negative acidified potassium iodide-starch test of the reaction mixture is obtained. Dilution with cold water results in the precipitation of 2α - methyl - 6 - fluoro - 17α - hydroxy - 4,9(11) - pregnadiene-3,20-dione, which can be purified by recrystallization from acetone. The crystalline product can then be reacted in methylene chloride-tertiary butyl alcohol solution with perchloric acid and N-bromo-acetamide or N-iodosuccinimide to produce a reaction mixture from which 2α-methyl-6-fluoro-9α-bromo-11β,17α-dihydroxy-4-pregnene-3,20-dione or the corresponding 2α-methyl-6-fluoro-9α-iodo compound can be recovered by precipitation with ice water and recrystallization from acetone. The latter compounds can then be reacted in acetone solution with anhydrous potassium acetate at reflux temperatures to produce 2α-methyl-6-fluoro-9β,11β-oxido-17α-hydroxy-4-pregnene-3,20-dione, which is recoverable from the reaction mixture by chromatography and can be further purified by recrystallization from Skellysolve B hexanes-acetone. Reaction of the said 9,11-oxido compound in methylene chloride solution with aqueous hydrogen fluoride or hydrogen fluoride gas in the presence of tetrahydrofuran at room temperature is productive of 2α-methyl-6,9α-difluoro-11β,17α-dihydroxy-4-pregnene-3,20-dione. Substitution of aqueous hydrogen chloride for the hydrogen fluoride above yields 2α-methyl-6-fluoro - 9α - chloro - 11β,17α - dihydroxy - 4 - pregnene-3,20-dione. If desired, either the 9α-fluoro, chloro, bromo or iodo product can be oxidized, for example, with chromic acid in acetic acid solution to give 2α-methyl - 6,9α - difluoro - 17α - hydroxy - 4 - pregnene-3,11,20-trione, the corresponding 9α-chloro compound, the corresponding 9α-bromo compound, or the corresponding 9α-iodo compound.

In like manner, substitution of 2-methyl-6-fluoro-11β,17α-dihydroxy-1,4-pregnadiene-3,20-dione prepared in Group (D), above for 2α-methyl-6-fluoro-11β,17α-dihydroxy-4-pregnene-3,20-dione in the above alternative process is productive of the corresponding 2-methyl-6-fluro - 9α - halo - 11 - oxygenated - 17α - hydroxy-1,4-pregnadiene-3,20-diones, for example 2-methyl-6,9α-difluoro-11β,17α-dihydroxy-1,4-pregnadiene-3,20-dione, 2-methyl-6,9α-difluoro-17α-hydroxy-1,4-pregnadiene-3,11,20-trione, and their corresponding 9α-chloro, 9α-bromo and 9α-iodo analogues.

In the foregoing processes, it should be understood that the corresponding 6β-epimer can be utilized at any stage and the 6α-epimer obtained at appropriate intermediate stages by treatment of the 6β-compound, at temperatures of zero degrees centigrade or slightly lower, in an organic solvent such as chloroform and in the presence of alcohol, with an anhydrous mineral acid, such as hydrochloric acid. The reduced temperatures should be maintained throughout the period of addition of the acid. The reaction mixture can then be washed with successive portions of dilute alkali and water and evaporated under reduced pressure to obtain the 6α-epimer.

GROUP G

The novel 6α-fluoro and 6β-fluoro steroid compounds of Group (G) of this invention, 2α-methyl-6,21-difluoro-9α-halo - 11 - oxygenated - 17α - hydroxy-4-pregnene-3,20-diones and the corresponding 1-dehydro compounds, for example 2α-methyl-6,21-difluoro-9α-halo - 11β,17α - dihydroxy-4-pregnene-3,20-dione, 2α-methyl-6,21-difluoro-9α-halo-17α-hydroxy-4-pregnene-3,11,20-trione, 2-methyl-6,-21-difluoro-9α-halo-11β,17α-dihydroxy-1,4 - pregnadiene-3,20 - dione, and 2-methyl-6,21-difluoro-9α-halo-17α-hydroxy-1,4-pregnadiene-3,11,20-trione are represented by the following formula:

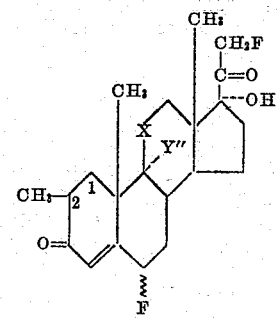

XLVII wherein X and Y″ have the meanings previously given and the 1,2-carbon atom linkage is selected from the linkages consisting of single bond and double bond linkages.

The novel compounds of Group (G) of this invention can be prepared in accordance with the following reactions:

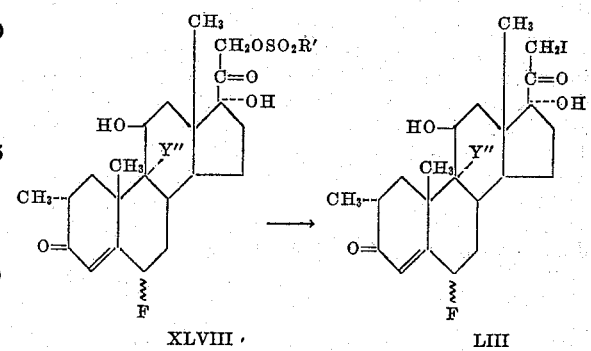

XLVIII       LIII

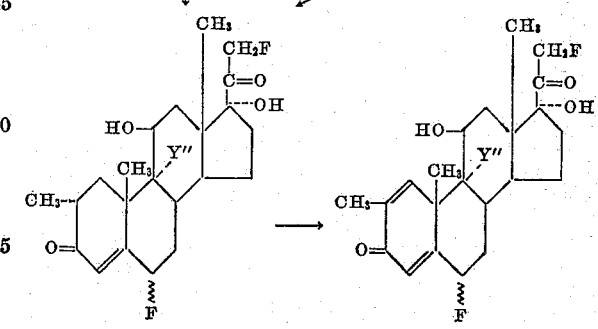

XLIX          LI

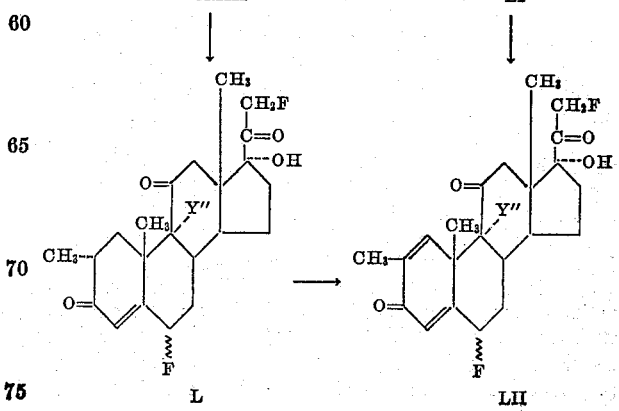

L             LII wherein R' and Y" have the meanings previously given.

The process of Group (G) of the present invention comprises treating 2α-methyl-6-fluoro-9α-halo-11β,17α-21-trihydroxy-4-pregnene-3,20-dione 21-alkyl or aryl sulfonate (XLVIII) with a fluorinating agent to obtain the corresponding 2α - methyl-6,21-difluoro-9α-halo-11β,17α-dihydroxy -4-pregnene-3,20-dione (XLIX). If desired, the 6,21-difluoro product above can be oxidized to give the corresponding 2α-methyl-6,21-difluoro-9α-halo-17α-hydroxy-4-pregnene-3,11,20-trione (L). Alternatively, 2α - methyl-6-fluoro-9α-halo-11β,17α-dihydroxy-21-iodo-4-pregnene-3,20-dione can be fluorinated to yield the 21-fluoro steroid (XLIX). Similarly, when the corresponding 11-keto compounds (2α-methyl-6-fluoro-9α-halo-17α,21-dihydroxy-4-pregnene-3,11,20-trione 21-alkyl or aryl sulfonate or 2α-methyl-6-fluoro-9α-halo-17α-hydroxy-21-iodo-4-pregnene-3,11,20-trione) are utilized as the starting material in the above series of reactions, 2α-methyl-6,21-difluoro-9α-halo - 17α - hydroxy-4-pregnene-3,11,20-trione (L) is produced directly without the step of oxidation of the 11β-hydroxyl group.

The selected 2α-methyl-6,21-difluoro-9α-halo-11β,17α-dihydroxy-4-pregnene-3,20-dione or 2α-methyl-6,21-difluoro - 9α-halo - 17α-hydroxy-4-pregnene-3,11,20-trione thus produced, is 1-dehydrogenated by fermentative or chemical dehydrogenation to produce the corresponding 2-methyl - 6,21-difluoro - 9α-halo-11β,17α-dihydroxy-1,4-pregnadiene-3,20-dione (LI), or the corresponding 2-methyl - 6,21-difluoro - 9α-halo - 17α-hydroxy-1,4-pregnadiene-3,11,20-trione (LII).

The starting materials for Group (G) of the present invention are the 21-alkyl or aryl sulfonates of 2α-methyl-6-fluoro-9α-halo-11-oxygenated-17α-hydroxy - 4-pregnene-3,20-diones (XLVIII) or the 2α-methyl-6-fluoro-9α-halo-11-oxygenated - 17α-hydroxy - 21-iodo-4-pregnene-3,20-diones (LIII), for example, 2α-methyl-6α-fluoro-9α-halo-11β,17α-dihydroxy - 4-pregnene - 3,20-dione 21-methanesulfonate, 2α - methyl - 6β-fluoro - 9α-halo-11β,17α-dihydroxy - 4 - pregnene-3,20-dione 21-methanesulfonate, 2α-methyl-6α-fluoro-9α-halo-17α-hydroxy-4-pregnene - 3,11,20-trione 21-methanesulfonate, 2α-methyl-6β-fluoro-9α-halo-17α-hydroxy-4-pregnene-3,11,20-trione 21-methanesulfonate, 2α-methyl - 6α-fluoro - 9α-halo-11β,17α-dihydroxy - 21 - iodo - 4-pregnene-3,20-dione, 2α-methyl-6β-fluoro-9α-halo-11β,17α-dihydroxy-21-iodo - 4 - pregnene-3,20-dione, 2α-methyl-6α-fluoro-9α-halo-17α-hydroxy-21-iodo-4-pregnene-3,11,20-trione and 2α-methyl-6β-fluoro-9α - halo - 17α-hydroxy-21-iodo-4-pregnene-3,11,20-trione prepared in Group (F), above, and represented in Group (F) by Formulae XLI and XLII.

In carrying out the process of the present invention, the selected 2α-methyl-6-fluoro-9α-halo-11β,17α,21-trihydroxy-4-pregnene-3,20-dione 21-alkyl or aryl sulfonate (XLVIII) is reacted with a fluorinating agent such as potassium fluoride, silver fluoride or antimony fluoride in an inert solvent such as dimethyl sulfoxide, acetonitrile, dimethylformamide or ethylene glycol solution, the preferred combination being potassium fluoride in dimethylsulfoxide. The reaction is advantageously conducted under continuous heating, and it proceeds generally for a period of about six to 24 hours, fifteen to twenty hours usually being sufficient. The reaction mixture is then diluted with water and extracted with an organic solvent such as methylene chloride, chloroform, benzene, and the like, and purified in a conventional manner, as, for example, by chromatography or recrystallization to give the corresponding 2α-methyl-6,21-difluoro-9α-halo - 11β,17α-dihydroxy-4-pregnene-3,20-dione.

Alternatively, the selected 2α-methyl-6-fluoro-9α-halo-11β,17α - dihydroxy-21-iodo-4-pregnene - 3,20-dione, dissolved in a solvent such as acetonitrile, dimethylformamide or ethylene glycol, is treated with a metal fluoride such as silver fluoride, antimony fluoride, potassium fluoride, or the like, acetonitrile and silver fluoride being preferred. The metal fluoride should be added in small quantities at intervals, and the reaction mixture should be protected from light during the reaction period, which usually ranges from about one-half to six hours. The reaction mixture is then concentrated and the product extracted as in previous purification steps to yield the corresponding 2α - methyl-6,21-difluoro-9α-halo-11β,17α-dihydroxy-4-pregnene-3,20-dione.

The foregoing reactions constituting either the principal or alternative routes can likewise be conducted on the corresponding 11-keto compounds.

The oxidation of the selected 2α-methyl-6,21-difluoro-9α-halo-11β,17α-dihydroxy-4-pregnene-3,20-dione can be carried out by a variety of methods, such as, for example, by oxidizing the said 6,21-difluoro steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by addition of methyl alcohol, ethyl alcohol, and the like for the chromic acid oxidant or a bisulfite for N-bromoacetamide, N-bromosuccinimide and other N-haloacyl amides and imides. Thereafter, the resulting 2α-methyl-6,21-difluoro-9α-halo-17α-hydroxy-4-pregnene-3,11,20-trione is recovered by conventional means, such as by extraction with water-immiscible solvents, e.g., methylene chloride, ether, benzene, toluene or the like.

The dehydrogenation of the selected 2α-methyl-6,21-difluoro - 9α - halo-11-oxygenated-17α-hydroxy-4-pregnene-3,20-dione, for example 2α-methyl-6,21-difluoro-9α-halo-11β,17α-hydroxy-4-pregnene-3,20-dione (XLIX) or 2α-methyl - 6,21 - difluoro-9α-halo-17α-hydroxy-4-pregnene-3,11,20-trione (L) to obtain the corresponding 1-dehydro compounds, for example, 2-methyl-6,21-difluoro-9α-halo-11β,17α-dihydroxy-1,4-pregnadiene-3,20-dione (LI) and 2 - methyl-6,21-difluoro-9α-halo-17α-hydroxy-1,4-pregnadiene-3,11,20-trione (LII) can be carried out by fermentative or chemical dehydrogenation. Microorganisms such as, for example, Septomyxa, Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used under fermentation conditions well known in the art (e.g., U.S. 2,602,769) and furthermore illustrated by Examples 7G and 8G herein.

When Septomyxa is used to effect the dehydrogenation of the compounds of Formula XLIX it is advantageous to use with the substrate and medium a steroid promotor, such as, progesterone, 3-ketobisnor-4-cholen-22-al, 3-ketobisnorcholenic acid, 11β,21-dihydroxy-1,4-17(20)-pregnatrien-3-one, and the like.

The chemical dehydrogenation can be carried out with selenium dioxide according to known procedures [e.g., Meystre et al., Helv. Chim. Acta, 39, 734 (1956)].

Alternatively, if desired, fluorination at carbon atom 21 can be accomplished first and this can then be followed by halogenation at carbon atom 9.

For example, 2α - methyl-6,21-difluoro-11β-17α-dihydroxy-4-pregnene-3,20-dione prepared in Group (E) above can be dehydrated with N-bromoacetamide and anhydrous sulfur dioxide in pyridine solution by permitting the reaction to continue until a negative acidified potassium iodide-starch test of the reaction mixture is obtained. Dilution with cold water results in the precipitation of 2α-methyl-6,21-difluoro-17α-hydroxy - 4,9(11)-pregnadiene-3,20-dione, which can be purified by recrystallization from acetone. The crystalline product can then be reacted in methylene chloride-tertiary-butyl alcohol solution with perchloric acid and N-bromoacetamide or N-iodosuccinimide to produce a reaction mixture from which 2α-methyl-6,21-difluoro-9α-bromo-11β,17α-dihydroxy-4-pregnene-3,20-dione or the corresponding 6,21-difluoro-9α-iodo compound can be recovered by precipitation with ice water and recrystallization from acetone. The latter steroids can then be reacted in acetone solution with anhydrous potassium acetate at reflux temperatures to produce 2α-methyl-6,21-difluoro-9β,11β-oxido-17α-hydroxy-4-pregnene-3,20-dione, which is recoverable from the reaction mixture by chromatography and can be further purified by recrystallization from Skellysolve B hexanes-acetone. Reaction of the said 9,11-oxido compound in methylene chloride solution with aqueous hydrogen fluoride or liquid hydrogen fluoride in the presence of tetrahydrofuran is productive of 2α-methyl-6,9α,21 - trifluoro-11β,17α-dihydroxy-4-pregnene-3,20-dione. Substitution of aqueous hydrogen chloride for the hydrogen fluoride above yields 2α-methyl-6,21-difluoro-9α-chloro - 11β,17α - dihydroxy-4-pregene-3,20-dione. If desired, either the 9α-fluoro, 9α-chlor, 9α-bromo or 9α-iodo product can be oxidized, for example, with chromic acid to give 2α-methyl-6,9α,21-trifluoro-17α-hydroxy-4-pregnene-3,11,20-trione or the corresponding 9α-chloro, 9α-bromo or 9α-iodo compounds.

In like manner, substitution of 2-methyl-6,21-difluoro-11β,17α - dihydroxy - 1,4 - pregnadiene - 3,20 - dione prepared in Group (E), above, for 2α-methyl-6,21-difluoro-11β,17b - dihydroxy - 4 - pregnene - 3,20 - dione in the above alternative process is productive of the corresponding 2 - methyl - 6,21 - difluoro - 9a - halo - 11 - oxygenated - 17α - hydroxy - 1,4 - pregnadiene - 3,20 - diones, for example 2 - methyl - 6,9a,21 - trifluoro - 11β,17α-dihydroxy - 1,4 - pregnadiene - 3,20 - dione, 2 - methyl-6,9α,21 - trifluoro - 17α - hydroxy - 1,4 - pregnadiene-3,11,20-trione and their corresponding 9α-chloro, 9α-bromo and 9α-iodo analogues.

In the foregoing processes, it should be understood that the corresponding 6β-epimer can be utilized at any stage and the 6α-epimer obtained at appropriate intermediate stages by treatment of the 6β-compound, at temperatures of zero degrees centigrade or slightly lower, in an organic solvent such as chloroform and in the presence of alcohol, with an anhydrous mineral acid, such as hydrochloric acid. Such temperatures should be maintained throughout the period of addition of the acid. The reaction mixture can then be washed with successive portions of dilute alkali and water and evaporated under reduced pressure to obtain the 6α-epimer.

The following preparation and examples are illustrative of the process and products of the present invention but are not to be construed as limiting.

In the examples which follow, the Roman numeral following the name of a compound is used to indicate the relation of the compound to the reaction schemes depicted and described above.

PREPARATION 1

*2α-methyl-6α-fluoro-11β,17α,21-trihydroxy-4-pregnene-3,20-dione*

2α - methyl - 6α - fluoro - 11β,17α,21 - trihydroxy - 4-pregnene-3,20-dione, 21-acetate, 278 milligrams (0.637 millimole) was dissolved in 30 milliliters of methyl alcohol. This solution was purged of air by bubbling nitrogen through the solution for five minutes. A solution of 150 milligrams of potassium bicarbonate in 3 milliliters of water was also purged of air with nitrogen and was then added to the solution of the steroid. This reaction mixture was stirred at room temperature and kept in a nitrogen atmosphere for five hours. The reaction mixture was made barely acid by the addition of two drops of glacial acetic acid and was diluted with thirty milliliters of water. The methanol was removed by distillation at reduced pressure. The product was extracted from the aqueous mixture with three ten-milliliter portions of methylene chloride. The extract was dried over anhydrous sodium sulfate and evaporated to dryness to give 100 milligrams (0.254 millimole) of 2α-methyl-6α-fluoro-11β,17α,21 - trihydroxy - 4 - pregnene - 3,20 -dione, a white crystalline solid, melting at 200 to 206 degrees centigrade.

Following the procedure of Preparation 1, saponification of 2α-methyl-6α-fluoro-17α,21-dihydroxy-4-pregnene-3,11,20-trione 21-acetate, 2α-methyl-6β-fluoro-11β,17α,21-trihydroxy - 4 - pregnene - 3,20 - dione 21 - acetate and 2α - methyl - 6β -fluoro - 17α,21 - dihydroxy - 4 - pregnene-3,11,20-trione 21-acetone is productive of the corresponding 21-hydroxy compounds, 2α-methyl-6α-fluoro-17α,21 - dihydroxy - 4 - pregnene - 3,11,20 - trione,2α-methyl - 6β - fluoro - 11β,17α,21 - trihydroxy - 4 - pregnene - 3,20 - dione and 2α -methyl - 6β - fluoro-17α,21-dihydroxy-4-pregnene-3,11,20-trione.

EXAMPLE 1A

*2-methyl-6α-fluoro-11β,17α,21-trihydroxy-1,4-pregnadiene-3,20-dione (IV)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α-fluoro-11β,17α,21-trihydroxy-4-pregnene-3,20-dione (III) plus one-half gram of 3-ketobisnor-4-cholen-22-al dissolved in sixteen milliliters of dimethylformamide is added and the incubation carried out at the same temperature (28 degrees centigrade) and aeration for a period of 72 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α-fluoro-11β,17α,21-trihydroxy-1,4-pregnadiene-3,20-dione, a crystalline solid.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used to introduce a Δ¹-bond into 2α-methyl-6α-fluoro-11β,17α,21-trihydroxy-4-pregnene-3,20-dione.

EXAMPLE 2A

*2 - methyl-6α-fluoro-17α,21-dihydroxy-1,4 - pregnadiene-3,11,20-trione (IV)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α-fluoro-17α,21-dihydroxy-4-pregnene-3,11,20-trione (III) plus one half gram of 3-ketobisnor-4-cholen-22-al dissolved in sixteen milliliters of dimethylformamide is added and the incubation carried out at the same temperature (28 degrees centigrade) and aeration for a period of 72 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α-fluoro-17α,21-dihydroxy-1,4-pregnadiene-3,11,20-trione, a crystalline solid. Instead of Septomyxa, species of other genera such as those listed in Example 1A can be used to introduce a $\Delta^1$-bond into 2α-methyl-6-fluoro-17α,21-dihydroxy-4-pregnene-3,11,20-trione.

Example 3A

*2-methyl-6β-fluoro-11β,17α,21-trihydroxy-1,4-pregnadiene-3,20-dione (IV)*

A stoichiometric equivalent amount of 2α-methyl-6β-fluoro - 11β,17α,21 - trihydroxy-4-pregnene-3,20-dione is substituted for 2α - methyl-6α-fluoro-11β,17α,21 - trihydroxy-4-pregnene-3,20-dione in the procedure of Example 1A, to obtain 2 - methyl-6β-flouro-11β,17α,21-trihydroxy-1,4-pregnadiene-3,20-dione, a crystalline solid.

Example 4A

*2 - methyl-6β-fluoro-17α,21 - dihydroxy-1,4-pregnadiene-3,11,20-trione (IV)*

A stoichiometric equivalent amount of 2α-methyl-6β-fluoro-17α,21-dihydroxy-4-pregnene-3,11,20-trione is substituted for 2α,methyl-6α-fluoro-17α,21-dihydroxy-4-pregnene-3,11,20-trione in the procedure of Example 2A, to obtain 2 - methyl-6β-fluoro-17α,21-dihydroxy-1,4-pregnadiene-3,11,20-trione, a crystalline solid.

Example 5A

*2-methyl-6α-fluoro-11β,17α,21-trihydroxy-1,4-pregnadiene-3,20-dione 21-acetate (V)*

A solution is prepared containing fifty milligrams of 2 - methyl-6α-fluoro-11β,17α,21-trihydroxy - 1,4 - pregnadiene-3,20-dione (IV) in one milliliter of pyridine and one milliliter of acetic anhydride. The solution is allowed to stand at room temperature for a period of 21 hours and is thereupon poured into ice water to give crystals of 2-methyl-6α-fuoro-11β,17α,21-trihydroxy-1,4-pregnadiene-3,20-dione 21-acetate, which can be purified by recrystallization from acetone-Skellysolve B hexanes.

In the same manner, substitution of 2-methyl-6β-fluoro-11β,17α,21 - trihydroxy-1,4-pregnadiene-3,20-dione for 2-methyl-6α-fluoro-11β,17α,21-trihydroxy-1,4 - pregnadiene-3,20-dione produces 2-methyl-6β-fluoro-11β,17α,21-trihydroxy-1,4-pregnadiene-3,20-dione 21-acetate, a crystalline solid.

Example 6A

*2-methyl-6α-fluoro-17α,21-dihydroxy-1,4-pregnadiene-3,11,20-trione 21-acetate (V)*

A solution is prepared containing fifty milligrams of 2 - methyl - 6α-fluoro-17α,21-dihydroxy-1,4-pregnadiene-3,11,20-trione (IV) in one milliliter of pyridine and one milliliter of acetic anhydride. The solution is allowed to stand at room temperature for a period of 21 hours and is thereupon poured into ice water to give crystals of 2 - methyl - 6α-fluoro-17α,21-dihydroxy-1,4-pregnadiene-3,11,20-trione 21-acetate, which can be purified by recrystallization from acetone-Skellysolve B hexanes.

In the same manner substitution of 2-methyl-6β-fluoro-17α,21-dihydroxy-1,4-pregnadiene-3,11,20-trione for 2-methyl - 6α - fluoro-17α,21-dihydroxy-1,4-pregnadiene-3,11,20-trione produces 2-methyl-6β-fluoro-17α,21-dihydroxy-1,4-pregnadiene-3,11,20-trione 21-acetate, a crystalline solid.

Example 7A

*2-methyl-6α-fluoro-11β,17α,21-trihydroxy-1,4-pregnadiene-3,20-dione 21-hemisuccinate (V)*

A solution is prepared containing 0.5 gram of succinic anhydride and 0.1 gram of 2-methyl-6α-fluoro-11β,17α, 21-trihydroxy-1,4-pregnadiene-3,20-dione (IV) in five milliliters of pyridine. This solution is allowed to stand for a period of twenty hours, diluted with water and the mixture refrigerated and filtered. The precipitate thus collected on filter paper is recrystallized two times from methanol to give 2-methyl-6α-fluoro-11β,17α,21-trihydroxy-1,4-pregnadiene-3,20-dione 21-hemisuccinate, a crystalline solid.

Similarly, substitution of 2-methyl-6β-fluoro-11β,17α, 21-trihydroxy-1,4-pregnadiene-3,20-dione for 2-methyl-6α - fluoro - 11β,17α,21-trihydroxy-1,4-pregnadiene-3,20-dione produces 2-methyl-6β-fluoro-11β,17α,21-trihydroxy-1,4-pregnadiene-3,20-dione 21-hemisuccinate, a crystalline solid.

In the same manner as in Example 7A, other esters of 2 - methyl - 6α - fluoro - 11β,17α,21-trihydroxy-1,4-pregnadiene-3,20-dione and 2-methyl-6β-fluoro-11β,17α,21-trihydroxy-1,4-pregnadiene-3,20-dione are prepared by allowing these compounds to react with the selected organic carboxylic acid, preferably a hydrocarbon carboxylic acid containing from one to twelve carbon atoms, inclusive, or the anhydride or acyl halide thereof, such as, for example, those listed, above. Illustrative of the compounds thus produced are the 21-propionate, 21-isobutyrate, 21-(β-cyclopentylproprionate), 21-benzoate, 21-acrylate, 21-cinnamate, 21-maleate, and the like, of 2-methyl - 6α - fluoro - 11β,17α,21 - trihydroxy - 1,4-pregnadiene-3,20-dione, and 2-methyl-6β-fluoro-11β,17α,21-trihydroxy-1,4-pregnadiene-3,20-dione, represented by Formula V.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst.

Example 8A

*2-methyl - 6α - fluoro-17α,21-dihydroxy-1,4-pregnadiene-3,11,20-trione 21-hemisuccinate (V)*

A solution is prepared containing 0.5 gram of succinic anhydride and 0.1 gram of 2-methyl-6α-fluoro-17α,21-dihydroxy - 1,4 - pregnadiene - 3,11,20-trione (IV) in five milliliters of pyridine. This solution is allowed to stand for a period of twenty hours, diluted with water and the mixture refrigerated and filtered. The precipitate thus collected on filter paper is recrystallized two times from methanol to give 2-methyl-6α-fluoro-17α,21 - dihydroxy-1,4-pregnadiene - 3,11,20-trione 21-hemisuccinate, a crystalline solid.

Similarly, substitution of 2-methyl-6β-fluoro-17α,21-dihydroxy - 1,4 - pregnadiene - 3,11,20-trione for 2-methyl-6α-fluoro - 17α,21 - dihydroxy - 1,4-pregnadiene-3,11,20-trione produces 2-methyl - 6β - fluoro - 17α,21-dihydroxy-1,4-pregnadiene - 3,11,20 - trione 21 - hemisuccinate, a crystalline solid.

In the same manner as in Example 7A, other esters of 2 - methyl - 6α - fluoro-17α,21-dihydroxy-1,4-pregnadiene-3,11,20-trione and 2 - methyl-6β-fluoro-17α,21-dihydroxy - 1,4 - pregnadiene - 3,11,20-trione are prepared by allowing these steroids to react with the selected organic carboxylic acid, preferably a hydrocarbon carboxylic acid containing from one to twelve carbon atoms, inclusive, or the anhydride or acyl halide, thereof, such as for example, those listed, above. Illustrative of the compounds thus produced are the 21-propionate, 21-isobutyrate, 21-(β-cyclopentylpropionate), 21-benzoate, 21-acrylate, 21-cinnamate, 21-maleate, and the like, of 2-methyl-6α-fluoro-17α,21 - dihydroxy - 1,4-pregnadiene - 3,11,20-trione and 2 - methyl - 6β - fluoro-17α,21-dihydroxy-1,4-pregnadiene-3,11,20-trione, represented by Formula V.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst

Example 9A

*2-methyl - 6α - fluoro-11β,17α,21-trihydroxy-1,4-pregnadiene-3,20 - dione 21-hemisuccinate sodium salt*

Sodium hydroxide solution (0.1 normal) is slowly added to a stirred solution of 100 milligrams of 2-methyl-6α-fluoro - 11β,17α,21 - trihydroxy - 1,4-pregnadiene-3,20-dione 21-hemisuccinate dissolved in two milliliters of acetone, until the pH rises to about 7.4. During the addition of sodium hydroxide solution, five milliliters of water is also added. The solution is then concentrated at 25 degrees centigrade under vacuum to remove the acetone. The resulting aqueous solution of 2-methyl-6α-fluoro-11β,17α,21 - trihydroxy - 1,4 - pregnadiene - 3,20-dione 21-hemisuccinate sodium salt is filtered and freeze-dried to give pure 2-methyl - 6α - fluoro-11β,17α,21-trihydroxy-1,4-pregnadiene-3,20 - dione 21 - hemisuccinate sodium salt.

Similarly, substitution of 2-methyl-6α-fluoro-17α,21-dihydroxy - 1,4 - pregnadiene - 3,11,20-trione 21-hemisuccinate, 2 - methyl - 6β - fluoro - 11β,17α,21 - trihydroxy-1,4 - pregnadiene - 3,20 - dione 21-hemisuccinate, and 2-methyl-6β-fluoro - 17α,21 - dihydroxy - 1,4-pregnadiene-3,11,20 - trione 21 - hemisuccinate for 2-methyl-6α-fluoro-11β,17α,21 - trihydroxy - 1,4-pregnadiene - 3,20-dione 21-hemisuccinate produces 2-methyl-6α-fluoro-17α,21-dihydroxy-1,4-pregnadiene-3,11,20-trione 21-hemisuccinate sodium salt, 2-methyl-6β-fluoro-11β,17α,21-trihydroxy-1,4-pregnadiene-3,20-dione 21-hemisuccinate sodium salt, and 2-methyl-6β-fluoro-17α,21-dihydroxy-1,4-pregnadiene - 3, 11,20-trione 21-hemisuccinate sodium salt, respectively.

Example 10A

*Isomerization of 2-methyl - 6β - fluoro-11β,17α,21-trihydroxy - 1,4 - pregnadiene-3,20-dione to 2-methyl-6α-fluoro - 11β,17α,21 - trihydroxy-1,4-pregnadiene-3,20-dione*

A solution of 0.150 gram of 2-methyl-6β-fluoro-11β, 17α,21 - trihydroxy - 1,4-pregnadiene-3,20-dione in twelve milliliters of chloroform and 0.1 milliliter of absolute alcohol is cooled to minus ten degrees centigrade in an ice-salt bath and a stream of anhydrous hydrogen chloride is gently bubbled through the solution for about 2.5 hours while the temperature is maintained between approximately minus five and minus fifteen degrees centigrade. The solution is then washed with dilute sodium bicarbonate and water, dried over anhydrous sodium sulfate, and evaporated to dryness under reduced pressure. Crystallization of the residue from acetone-Skellysolve B hexanes gives 2-methyl-6α-fluoro - 11β,17α,21-trihydroxy-1,4 - pregnadiene-3,20-dione, a crystalline solid.

In a similar manner 2-methyl-6β-fluoro-17α,21-dihydroxy - 1,4 - pregnadiene - 3,11,20 - trione, the 21-acylates of 2 - methyl - 6β - fluoro-11β,17α,21-trihydroxy - 1,4-pregnadiene-3,20-dione, and the 21-acylates of 2-methyl-6β - fluoro - 17α,21-dihydroxy-1,4 - pregnadiene-3,11,20-trione are converted to the corresponding 6α-fluoro compounds.

Example 1B

*2α - methyl - 6α - fluoro-17α,21-dihydroxy-4,9(11)-pregnadiene-3,20-dione 21-acetate (VIII)*

To a solution of one gram of 2α-methyl-6α-fluoro-11β, 17α,21-trihydroxy - 4 - pregnene-3,20-dione 21-acetate (VII) in ten milliliters of pyridine is added 0.4 gram of N-bromoacetamide. The mixture is allowed to stand under nitrogen for a period of about twenty minutes, at which time it is cooled to five degrees centigrade. While stirring, anhydrous sulfur dioxide is passed over the surface until the solution gives no color change with acidified starch-iodide paper. The temperature of the reaction mixture is not allowed to go above twenty degrees centigrade during the sulfur dioxide addition. The mixture is then allowed to stand for about five minutes and is poured into 100 milliliters of ice-water, resulting in precipitation of a crude solid. Crystallization from acetone gives 2α-methyl-6α-fluoro-17α,21 - dihydroxy - 4,9(11)-pregnadiene - 3,20- dione 21-acetate, a crystalline solid.

Example 2B

*2α - methyl - 6α - fluoro - 9α - bromo - 11β,17α,21 - trihydroxy-4-pregnene-3,20-dione 21-acetate (IX)*

To a solution of 420 milligrams of 2α-methyl-6α-fluoro-17α,21 - dihydroxy - 4,9(11) - pregnadiene - 3,20 - dione 21-acetate (VIII) in 6.5 milliliters of methylene chloride is added 12.5 milliliters of tertiary butyl alcohol, a solution of 1.0 milliliter of 72 percent perchloric acid in 7.5 milliliters of water, and a solution of 182 milligrams of N-bromoacetamide in 3.2 milliliters of tertiary butyl alcohol. After stirring for a period of about fifteen minutes, a solution of 182 milligrams of sodium sulfite in ten milliliters of water is added and the mixture concentrated under reduced pressure at about sixty degrees centigrade until crystallization occurs. After cooling in an ice bath, thirty milliliters of water is added with stirring. The crystalline product is filtered, washed with water and dried, giving essentially pure 2α-methyl-6α-fluoro-9α-bromo - 11β,17α,21 - trihydroxy - 4 - pregnene - 3,20-dione 21-acetate. The product was used in the succeeding example without further purification.

Substitution of another N-haloamide or an N-haloimide such as N-iodosuccinimide or N-chlorosuccinimide for the N-bromoacetamide in the foregoing reaction is productive of the corresponding 9α-halo product.

Example 3B

*2α - methyl - 6α - fluoro - 9β,11β - oxido - 17α,21 - dihydroxy-4-pregnene-3,20-dione 21-acetate (X)*

A mixture of 2.816 grams of 2α-methyl-6α-fluoro-9α-bromo - 11β,17α,21 - trihydroxy - 4 - pregnene - 3,20-dione 21-acetate (IX), from Example 2B, 2.816 grams of potassium acetate, and ninety milliliters of acetone is stirred and heated at reflux temperature for a period of approximately eighteen hours. The reaction mixture is then concentrated to about one-half the original volume and cooled in an ice bath. Addition of 250 milliliters of water gives 2α-methyl-6α-fluoro-9β,11β-oxido-17α,21-dihydroxy-4-pregnene-3,20 dione 21-acetate, a crystalline solid, which can be further purified by recrystallization from acetone.

Example 4B

*2α - methyl - 6α,9α - difluoro - 11β,17α,21 - trihydroxy-4-pregnene-3,20-dione 21-acetate (XI)*

To 3.41 grams of liquid hydrogen fluoride cooled in a Dry-Ice bath is added, portion-wise, a slurry of 1.875 grams of 2α-methyl-6α-fluoro-9β,11β-oxido-17α,21-dihydroxy-4-pregnene-3,20-dione 21-acetate (X) in 5.97 grams of tetrahydrofuran (distilled over sodium hydroxide) and twenty milliliters of methylene chloride which has similarly been cooled in a dry-ice bath. The steroid is dissolved completely. After standing at zero to five degrees centigrade for a period of about seventeen hours, the reaction mixture is poured slowly into a stirred mixture of 300 milliliters ice-water, fifty milliliters of methylene chloride, and twenty grams of sodium bicarbonate. The mixture is stirred for a few minutes, the methylene chloride layer is separated and the water phase extracted with two fifty-milliliter portions of methylene chloride. The combined methylene chloride solutions are washed with water, dried and the solvent evaporated to give an oil. The oil is dissolved in a mixture of ten milliliters of acetic anhydride in ten milliliters of pyridine and allowed to stand for approximately twenty hours. The acetylation mixture is then poured into ice-water and extracted with methylene chloride. The extract is washed with dilute acid, dilute base and water, dried and chromatographed over a synthetic magnesium silicate column. Elution of the column with acetone in Skellysolve B hexanes gives a crystalline product, which is recrystallized several times from acetone-Skellysolve B hexanes to give $2\alpha$ - methyl - $6\alpha,9\alpha$ - difluoro - $11\beta,17\alpha,21$ - trihydroxy-4-pregnene-3,20-dione 21-acetate, a crystalline solid.

Substitution of aqueous hydrogen chloride or hydrogen bromide for the hydrogen fluoride above is productive of the corresponding $9\alpha$-chloro or $9\alpha$-bromo porduct, respectively.

Substitition in the procedure of Example 1B of other 21-esters of $2\alpha$-methyl-$6\alpha$-fluoro and $2\alpha$-methyl-$6\beta$-fluoro-$11\beta,17\alpha,21$ - trihydroxy - 4 - pregnene - 3,20 - diones, followed by the procedure of Examples 2B through 4B, is productive of the corresponding 21-esters of $2\alpha$-methyl-$6,9\alpha$ - difluoro - $11\beta,17\alpha,21$ - trihydroxy - 4 - pregnene-3,20 - dione, $2\alpha$ - methyl - 6 - fluoro - $9\alpha$ - chloro - $11\beta,17\alpha,21$ - trihydroxy - 4 - pregnene - 3,20 - dione, and $2\alpha$-methyl - 6 - fluoro - $9\alpha$ - bromo - $11\beta,17\alpha,21$ - trihydroxy-4-pregnene-3,20-dione, wherein the 6-fluoro substituent is the $6\alpha$- or $6\beta$-epimer.

EXAMPLE 5B

*$2\alpha$-methyl-$6\alpha,9\alpha$-difluoro-$11\beta,17\alpha,21$-trihydroxy-4-pregnene-3,20-dione (XII)*

Nitrogen is bubbled through a solution of 0.33 gram of $2\alpha$ - methyl - $6\alpha,9\alpha$ - difluoro - $11\beta,17\alpha,21$ - trihydroxy-4-pregnene-3,20-dione 21-acetate (XI) in 33 milliliters of methanol for a period of about fifteen minutes. To this is added a solution of 0.33 gram of potassium bicarbonate in four milliliters of water, likewise treated with nitrogen. After stirring under nitrogen for a period of approximately five hours, the base is neutralized by the addition of 2.5 milliliters of five percent hydrochloric acid. The mixture is then concentrated under reduced pressure at about fifty degrees centigrade to about five milliliters. The residue is taken up in ethyl acetate, washed, dried and evaporated to dryness. Crystallization from acetone-Skellysolve B hexanes yields $2\alpha$-methyl-$6\alpha,9\alpha$ - difluoro - $11\beta,17\alpha,21$ - trihydroxy - 4 - pregnene - 3,20-dione (XII), a crystalline solid.

Substitution of the corresponding $9\alpha$-chloro or $9\alpha$-bromo - $2\alpha$ - methyl - $6\alpha$ - fluoro - $11\beta,17\alpha,21$-trihydroxy-4-pregnene-3,20 dione 21-acetate in the above hydrolysis is productive of $2\alpha$-methyl-$6\alpha$-fluoro-$9\alpha$-chloro-$11\beta,17\alpha,21$ - trihydroxy - 4 - pregnene - 3,20 - dione and the corresponding $9\alpha$-bromo compound.

The $2\alpha$-methyl-$6\alpha,9\alpha$-difluoro-$11\beta,17\alpha,21$-trihydroxy-4-pregnene-3,20-dione of this example or its $9\alpha$-chloro or $9\alpha$-bromo analogues can be re-esterified at the 21-hydroxy group with the selected organic carboxylic acid, preferably a hydrocarbon carboxylic acid containing from one to twelve carbon atoms, inclusive, or the anhydride or acyl halide thereof, such as for example, a saturated straight-chain aliphatic acid, e.g. formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g. $\beta$-cyclopentylpropionic, cyclohexane-carboxylic, cyclohexylacetic, an alkaryl acid, e.g., benzoic, pentylacetic, $\beta$-phenylpropionic, o-, m-, and p-toluic, a saturated dibasic acid (which can be converted into water-soluble, e.g., sodium salts), e.g., succinic, adipic; a monobasic unsaturated acid, e.g., acrylic, crotonic, undecylenic, propiolic, undecolic, cinnamic, dibasic unsaturated acids (which can be converted into water soluble, e.g., sodium salts), e.g., maleic, citraconic, and the like.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst, such as for example, p-toluenesulfonyl chloride, trifluoroacetic anhydride, p-toluenesulfonic acid, trifluoroacetic acid, sulfuric acid and the like.

Reaction conditions which are apt to affect the labile $11\beta$-hydroxy group or 6-halo group should be avoided.

The resulting $2\alpha$-methyl-$6\alpha,9\alpha$-difluoro-$11\beta,17\alpha,21$-trihydroxy-4-pregnene-3,20-dione 21-acylate and its $9\alpha$-chloro and $9\alpha$-bromo analogues can be oxidized using the procedure shown in Example 7B, below, to produce the corresponding $2\alpha$-methyl-$6\alpha,9\alpha$-difluoro-$17\alpha,21$-dihydroxy-4-pregnene-3,11,20-trione 21-acylate, $2\alpha$-methyl-$6\alpha$-fluoro-$9\alpha$-chloro-$17\alpha,21$-dihydroxy-4-pregnene-3,11,20-trione 21-acylate, and $2\alpha$-methyl-$6\alpha$-fluoro-$9\alpha$-bromo-$17\alpha,21$-dihydroxy-4-pregnene-3,11,20-trione 21 acylate, respectively.

EXAMPLE 6B

*$2\alpha$-methyl-$6\alpha,9\alpha$-difluoro-$17\alpha,21$-dihydroxy-4-pregnene-3,11,20-trione (XIII)*

To a solution of 0.5 gram of $2\alpha$-methyl-$6\alpha,9\alpha$-difluoro-$11\beta,17\alpha,21$-trihydroxy-4-pregnene-3,20-dione (XII) and one milliliter of pyridine in 35 milliliters of tertiary butyl alcohol is added 250 milligrams of N-bromoacetamide. After standing at room temperature for a period of sixteen hours, the reaction mixture is diluted with 25 milliliters of water containing 250 milligrams of sodium sulfite and concentrated to about twenty milliliters, at which point precipitation occurs. The thus-obtained precipitate is collected on a filter and recrystallized three times from ethyl acetate and Skellysolve B hexanes to give $2\alpha$-methyl-$6\alpha,$-$9\alpha$-difluoro-$17\alpha,21$-dihydroxy - 4 - pregnene-3,11,20-trione (XIII).

Substitution of the corresponding $9\alpha$-chloro and $9\alpha$-bromo starting material in the above oxidation gives $2\alpha$-methyl-$6\alpha$-fluoro-$9\alpha$-chloro-$17\alpha,21$-dihydroxy-4-pregnene-3,11,20-trione and the corresponding $9\alpha$-bromo compound.

EXAMPLE 7B

*$2\alpha$-methyl-$6\alpha,9\alpha$-difluoro-$17\alpha,21$-dihydroxy-4-pregnene-3,11,20-trione 21-acetate (XIV)*

A solution is prepared containing 0.5 gram of $2\alpha$-methyl-$6\alpha,9\alpha$-difluoro-$11\beta,17\alpha,21$-trihydroxy-4-pregnene-3,20-dione 21-acetate (XI) 0.15 gram of chromium trioxide, ten milliliters of glacial acetic acid and one-half milliliter of water. This mixture is stirred and maintained at room temperature for a period of about eight hours, after which the reaction is terminated by addition of methanol. Thereafter, the mixture is poured into fifty milliliters of ice water and the thus-obtained precipitate collected on a filter and recrystallized three times from ethyl acetate and Skellysolve B hexanes to give $2\alpha$-methyl-$6\alpha,9\alpha$-difluoro-$17\alpha,21$-dihydroxy - 4 - pregnene-3,11,20-trione 21-acetate (XIV).

Substitution of the corresponding $9\alpha$-chloro and $9\alpha$-bromo startng steroid in the above reaction produces $2\alpha$-methyl-$6\alpha$-fluoro-$9\alpha$-chloro-$17\alpha,21$-dihydroxy-4- pregnene-3,11,20-trione 21-acetate and the corresponding $9\alpha$-bromo compound,

EXAMPLE 8B

*2α-methyl-6α,9α-difluoro-17α,21-dihydroxy-4-pregnene-3,11,20-trione (XIII)*

Following the procedure of Example 5B but substituting 2α-methyl-6α,9α-difluoro-17α,21-dihydroxy - 4 - pregnene-3,11,20-trione 21-acetate as the starting material therein is productive of 2α-methyl-6α,9α-difluoro-17α,21-dihydroxy-4-pregnene-3,11,20-trione.

Similarly, substituting 2α-methyl-6α-fluoro-9α-chloro-17α,21-dihydroxy-4 - pregnene - 3,11,20 - trione 21-acetate and its 9α-bromo analogue in the above hydrolysis gives 2α-methyl-6α-fluoro-9α-chloro-17α,21-dihydroxy-4 - pregnene-3,11,20-trione and 2α-methyl-6α-fluoro-9α-bromo-17α,21-dihydroxy-4-pregnene-3,11,20-trione.

EXAMPLE 9B

*2α-methyl-6β,9α-difluoro-17α,21-dihydroxy-4-pregnene-3,11,20-trione (XIV)*

Substituting 2α-methyl-6β-fluoro-11β,17α,21-trihydroxy-4-pregnene-3,20-dione 21-acetate for the starting material in Example 1B and following the procedures of Examples 1B through 8B, but maintaining near neutral reaction conditions, there is produced as the final product of each example the corresponding 6β-steroid, giving ultimately in Example 8B 2α-methyl-6β,9α - difluoro - 17α,21 - dihydroxy-4-pregnene-3,11,20-trione, 2α-methyl-6β-fluoro-9α-chloro-17α,21-dihydroxy-4-pregnene - 3,11,20 - trione and 2α-methyl-6β-fluoro-9α-bromo-17α,21-dihydroxy-4 - pregnene-3,11,20-trione.

The 6β-epimers thus obtained, as products of each of the foregoing examples, can be converted to the corresponding 6α-epimers by treatment with an acid or base in an organic solvent, following the procedure of Example 10A, herein.

EXAMPLE 1C

*2-methyl-6α-fluoro-17α,21-dihydroxy-1,4,9(11)pregnatriene-3,20-dione 21-acetate (XVII)*

To a solution of 1.05 grams of 2-methyl-6α-fluoro-11β,17α,21-trihydroxy-1,4-pregnadiene-3,20-dione 21 - acetate (XVI) in ten milliliters of pyridine is added 0.517 gram of N-bromoacetamide. The mixture is allowed to stand under nitrogen for a period of about fifteen minutes, at which time it is cooled to about five degrees centigrade. While stirring, sulfur dioxide is passed over the surface until the solution gives no color change with acidified starch-iodide paper. The temperature of the reaction mixture is not allowed to go above twenty degrees centigrade during the sulfur dioxide addition. The mixture is then poured into 100 milliliters of ice-water, resulting in precipitation of 2-methyl-6α-fluoro-17α-hydroxy-21-acetoxy-1,4,9(11)-pregnatriene-3,20-dione, a crystalline solid.

EXAMPLE 2C

*2-methyl-6α-fluoro-9α-bromo-11β,17α,21-trihydroxy-1,4-pregnadiene-3,20-dione 21-acetate (XVIII)*

To a solution of 1.27 grams of 2-methyl-6α-fluoro-17α-hydroxy-21-acetoxy-1,4,9(11)-pregnatriene - 3,20 - dione (XVII) in 19.5 milliliters of methylene chloride is added 38 milliliters of tertiary butyl alcohol, a solution of three milliliters of 72 percent perchloric acid in 22.5 milliliters of water, and a solution of 0.55 gram of N-bromoacetamide in 9.6 milliliters of tertiary butyl alcohol. After stirring for a period of about fifteen minutes, a solution of 0.55 gram of sodium sulfite in thirty milliliters of water is added and the mixture concentrated under reduced pressure at about sixty degrees centigrade until crystallization occurs. After cooling in an ice bath, 100 milliliters of water is added with stirring. On filtering the crystalline product, followed by washing with water and drying, a yield of essentially pure 2-methyl-6α-fluoro-9α-bromo - 11β,17α - dihydroxy - 21 - acetoxy - 1,4 - pregnadiene-3,20-dione is obtained. The product is used in the succeeding example without further purification.

Substitution of N-iodosuccinimide or N-chlorosuccinimide for the N-bromoacetamide in the foregoing reaction is productive of the corresponding 9α-iodo or 9α-chloro product, respectively.

EXAMPLE 3C

*2-methyl-6α-fluoro-9β,11β-oxido-17α,21-dihydroxy-1,4-pregnadiene-3,20-dione 21-acetate (XIX)*

A mixture of 1.749 grams of 2-methyl-6α-fluoro-9α-bromo - 11β,17α,21 - trihydroxy - 1,4 - pregnadiene - 3,20-dione 21-acetate (XVIII), 1.749 grams of potassium acetate, and fifty milliliters of acetone is stirred and heated at reflux temperature for a period of approximately eighteen hours. The reaction mixture is then concentrated to about one-half the original volume, cooled and poured into 300 milliliters of water to give 2-methyl-6α-fluoro-9β,11β - oxido - 17α,21 - dihydroxy - 1,4 - pregnadiene-3,20-dione 21-acetate, a crystalline solid, which can be further purified by recrystallization from acetone.

EXAMPLE 4C

*2-methyl-6α,9α-difluoro-11β,17α,21-trihydroxy-1,4-pregnadiene-3,20-dione 21-acetate (XX)*

To 5.2 grams of liquid hydrogen fluoride cooled in a dry-ice bath, there is added, portion-wise, a slurry of 2.276 grams of 2-methyl-6α-fluoro-9β,11β-oxido-17α,21-dihydroxy-1,4-pregnadiene-3,20-dione 21-acetate (XIX) in nine grams of tetrahydrofuran (distilled over NaOH) and 28 milliliters of methylene chloride which has similarly been cooled in a dry-ice bath. After standing at zero to five degrees centigrade for a period of about seventeen hours, the reaction mixture is poured slowly into a stirred mixture of 500 milliliters of water and 25 grams of sodium bicarbonate. The mixture is stirred for a few minutes, and the product is extracted with three 100-milliliter portions of methylene chloride. The methylene chloride solutions are washed with water, dried, and chromatographed over synethetic magnesium silicate. The material eluted from the column with acetone in Skellysolve B hexanes is recrystallized from ethyl acetate-Skellysolve B hexanes giving 2-methyl-6α,9α-difluoro - 11β,17α,21 - trihydroxy-1-4-pregnadiene - 3,20 - dione 21-acetate, a crystalline solid.

Substitution of aqeous hydrogen chloride and hydrogen bromide for the hydrogen fluoride above is productive of the corresponding 9α-chloro and 9αbromo product, respectively.

Substitution in the procedure of Example 1C of other 21-esters of 2-methyl-6α-fluoro-11β,17α,21-trihydroxy-1,4-pregnadiene-3,20-dione or 2-methyl-6β-fluoro-11β,17α,21-trihydroxy-1,4-pregnadiene-3,20-dione followed by the procedures of Example 2C through 4C above, is productive of the corresponding 21-esters of 2-methyl-6,9α-difluoro - 11β,17α,21 - trihydroxy - 1,4 - pregnadiene - 3,20 - dione, 2-methyl-6-fluoro-9α-chloro-11β,17α,21-trihydroxy-1,4 - pregnadiene-3,20-dione and 2-methyl-6-fluoro-9α-bromo - 11β,17α,21 - trihydroxy - 1,4 - pregnadiene - 3,20-dione, wherein the 6-fluoro substitutent is ether in the 6α or 6β configuration.

Among the 21-esters of 2-methyl-6α,9α-difluoro-11β,17α,21 - trihydroxy - 1,4 - pregnadiene-3,20-dione, the following are of particular interest because of the enhanced qualities of water-solubility or prolonged pharmacological activity which they possess, such esters being specifically embraced within the present invention: 2 - methyl - 6α,9α - difluoro - 11β,17α,21 - trihydroxy-1,4-pregnadiene-3,20-dione 21-hemisuccinate, 2-methyl-6α,9α-difluoro - 11β,17α,21 - trihydroxy - 1,4 - pregnadiene-3,20-dione 21 - hemiglutarate, 2 - methyl - 6α,9α - difluoro - 11β,17α,21 - trihydroxy - 1,4 - pregnadiene-3,20-dione 21-hemi-β,β-dimethylglutarate, and 2-methyl-6α,9α-difluoro-11β,17α,21 - trihydroxy - 1,4 - pregnadiene-3,20-dione 21 - hemimaleate, as the free acids or as the basic salts thereof (such as the alkali metal salts, and particularly the sodium salt), the amine salts (such as diethanolamine, epinephrine, etc.), phosphate and xanthogenate.

EXAMPLE 5C

*2-methyl-6α,9α-difluoro-11β,17α,21-trihydroxy-1,4-pregnadiene-3,20-dione (XXI)*

Nitrogen is bubbled through a solution of 1.4 grams of 2 - methyl - 6α,9α - difluoro - 11β,17α,21 - trihydroxy-1,4-pregnadiene-3,20-dione 21-acetate (XX) in 140 milliliters of methanol for about fifteen minutes. To this is added a solution of 1.4 grams of potassium bicarbonate in 17.5 milliliters of water likewise treated with nitrogen. After stirring under nitrogen for about five hours, the base is neutralized by the addition of 1.5 milliliters of acetic acid in forty milliliters of water. The mixture is then concentrated under reduced pressure at about 55 degrees centigrade until crystallization starts. The slurry is then cooled in an ice bath, diluted with 100 milliliters of water, and filtered to give 2-methyl-6α,9α-difluoro-11β,17α,21-trihydroxy-1,4-pregnadiene-3,20-dione, a crystalline solid.

The 2 - methyl - 6α - fluoro - 9α - chloro - 11β,17α,21-trihydroxy-1,4-pregnadiene-3,20-dione and its 9α-bromo analogue are prepared from their corresponding 21-acylates by hydrolysis in an acid-catalyzed reaction, as, for example, with methanol containing hydrochloric acid.

The 2 - methyl - 6α,9α - difluoro - 11β,17α,21 - trihydroxy-1,4-pregnadiene-3,20-dione of the present example and its 9α-chloro and 9α-bromo analogues can be re-esterified at the 21-position with the selected organic carboxylic acid, preferably a hydrocarbon carboxylic acid containing from one to twelve carbon atoms, inclusive, or the anhydride or acyl halide thereof, such as for example, a saturated straight-chain aliphatic acid, e.g., formic, acetic, propionic, butyric, valeric, hexanoic, lauric, a saturated branched-chain aliphatic acid, e.g., trimethyl acetic, isobutyric, isovaleric, tertiary butylacetic, a cycloaliphatic saturated acid, e.g., β-cyclopentylpropionic, cyclohexane-carboxylic, cyclohexylacetic, an alkaryl acid, e.g., benzoic, phenylacetic, β-phenylpropionic, o-, m-, and p-toluic, a saturated dibasic acid (which can be converted into water-soluble, e.g., sodium, salts), e.g., succinic, adipic; a monobasic unsaturated acid, e.g., acrylic, crotonic, undecylenic, propiolic, undecolic, cinnamic; dibasic unsaturated acids (which can be converted into water soluble, e.g., sodium, salts), e.g., maleic and citraconic, and the like.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst, such as for example, p-toluenesulfonyl chloride, trifluoroacetic anhydride, p-toluenesulfonic acid, trifluoroacetic acid, sulfuric acid and the like.

The resulting 2-methyl-6α,9α-difluoro-11β,17α,21-trihydroxy - 1,4 - pregnadiene - 3,20 - dione 21 - acylate and its 9α-chloro and 9α-bromo analogues can then be oxidized according to the procedure of Example 6C to produce the corresponding 21-acylates of 2-methyl-6α,9α-difluoro - 17α,21 - dihydroxy - 1,4 - pregnadiene - 3,11,20-trione, 2 - methyl - 6α - fluoro - 9α - chloro - 17α,21 - dihydroxy - 1,4 - pregnadiene - 3,11,20 - trione and 2-methyl - 6α - fluoro - 9α - bromo - 17α,21 - dihydroxy-1,4 - pregnadiene - 3,11,20 - trione, respectively.

Alternatively, the hydrolyzed 9α-fluoro, 9α-chloro and 9α-bromo products, before re-esterification can be oxidized with an N-haloamide or N-haloimide in pyridine solution to obtain 2-methyl - 6α,9α - difluoro - 17α,21-dihydroxy - 1,4 - pregnadiene - 3,11,20 - trione, 2 - methyl - 6α - fluoro - 9α - chloro - 17α,21 - dihydroxy - 1,4-pregnadiene - 3,11,20 - trione and 2 - methyl - 6α - fluoro-9α - bromo - 17α,21 - dihydroxy - 1,4 - pregnadiene-3,11,20 - trione.

EXAMPLE 6C

*2-methyl-6α,9α-difluoro-17α,21-dihydroxy-1,4-pregnadiene-3,11,20-trione 21-acetate (XXIII)*

A solution is prepared containing 0.5 gram of 2-methyl - 6α,9α - difluoro - 11β,17α,21 - trihydroxy - 1,4-pregnadiene-3,20-dione 21-acetate (XX), 0.15 gram of chromium trioxide, ten milliliters of glacial acetic acid and one-half milliliter of water. This mixture is stirred and maintained at room temperature for about eight hours. Thereafter, the excess oxidant is destroyed by addition of methanol and the mixture is poured into fifty milliliters of ice water. The resulting precipitate is collected on a filter and recrystallized three times from ethyl acetate-Skellysolve B hexanes to give 2 - methyl - 6α,9α-difluoro - 17α,21 - dihydroxy - 1,4 - pregnadiene - 3,11,20-trione 21-acetate, a crystalline solid.

Similarly, the corresponding 9α-chloro and 9α-bromo starting materials can be oxidized to give 2 - methyl - 6α-fluoro - 9α - chloro - 17α,21 - dihydroxy - 1,4 - pregnadiene - 3,11,20 - trione 21 - acetate and 2-methyl - 6α-fluoro - 9α - bromo - 17α, 21 - dihydroxy - 1,4 - pregnadiene - 3,11,20 - trione 21 - acetate, respectively

EXAMPLE 7C

*6β-epimers*

Substituting 2 - methyl - 6β - fluoro - 11β,17α,21 - trihydroxy 1,4 - pregnadiene - 3,20 - dione 21 - acetate for the starting material in Example 1C and following the procedures of Examples 1C through 6C, but maintaining near neutral reaction conditions, there is produced as the final product of each example the corresponding 6β-steroid, giving ultimately in Example 6C the 2 - methyl - 6β,9α - difluoro - 17α,21 - dihydroxy - 1,4-pregnadiene - 3,11,20 - trione 21 - acetate, 2 - methyl-6β - fluoro - 9α - chloro - 17α,21 - dihydroxy - 1,4 - pregnadiene - 3,11,20 - trione 21 - acetate and 2 - methyl-6β - fluoro - 9α - bromo - 17α,21 - dihydroxy - 1,4 - pregnadiene - 3,11,20 - trione 21 - acetate.

The 6β-epimers thus obtained, as products of each of the foregoing examples, can be converted to the corresponding 6α-epimers by treatment with an acid or base in an organic solvent, following the procedure of Example 10A herein.

EXAMPLE 1D

*2α-methyl-6α-fluoro-11β,17α,21-trihydroxy-4-pregnene-3,20-dione 21-methanesulfonate (XXVI)*

To a solution of 100 milligrams (0.254 millimole) of crude 2α-methyl - 6α - fluoro - 11β,17α,21 - trihydroxy-4-pregnene-3,20-dione (XXV) in three milliliters of pyridene (XXV) previously cooled to zero degrees centigrade there was added 0.2 milliliter of methanesulfonyl chloride. The reaction mixture was stirred at a temperature of zero to minus five degrees centigrade for a period of two hours. The reaction mixture was diluted with water and extracted with methylene chloride. This extract was washed with ice cold dilute hydrochloric acid to remove the pyridine. The methylene chloride extract was then washed with cold dilute aqueous sodium bicarbonate solution and dried over anhydrous sodium sulfate. The dried extract was then concentrated to dryness by distillation at reduced pressure. The semicrystalline, buff-colored product obtained was 2α-methyl-6α-fluoro-11β,17α,21-trihydroxy-4-pregnene-3,20-dione 21-methanesulfonate.

EXAMPLE 2D

*2α-methyl-6α-fluoro-21-iodo-11β,17α-dihydroxy-4-pregnene-3,20-dione (XXVII)*

The crude 2α-methyl-6α-fluoro-11β,17α,21-trihydroxy-4-pregnene-3,20-dione, 21-methane sulfonate (XXVI) was taken up in five milliliters of acetone. A solution of 150 milligrams of sodium iodide in three milliliters of acetone was added and the mixture was refluxed for a period of fifteen minutes with stirring. The heat was reduced and the mixture was concentrated to dryness by distillation under vacuum. The resulting 2α-methyl-6α-fluoro - 11β,17α-dihydroxy-21-iodo-4-pregnene-3,20-dione was employed in the succeeding step of Example 3D. Recrystallization from methylene chloride gives 2α-methyl-6α-fluoro - 11β,17α - dihydroxy - 21 - iodo-4-pregnene-3,20-dione, a crystalline solid, in high purity.

EXAMPLE 3D

*2α-methyl-6α-fluoro-11β,17α-dihydroxy-4-pregnene-3,20-dione (XXVIII)*

The 2α-methyl-6α-fluoro-11β,17α-dihydroxy-21-iodo-4-pregnene-3,20-dione (XXVII) of the preceding example was taken up in three milliliters of glacial acetic acid and stirred at room temperature (about 25 degrees centigrade) for a period of 45 minutes. Zinc powder, 200 milligrams, was added and the mixture was stirred for a period of fifteen minutes. The mixture was then diluted with methylene chloride and filtered on a sintered glass funnel to remove the excess zinc. The filtrate was washed with water and dilute sodium bicarbonate, respectively, and dried over anhydrous sodium sulfate. The dried extract was evaporated to dryness to give 105 milligrams of a partially crystalline solid. This crude product was redissolved in thirty milliliters of methylene chloride and chromatographed over ten grams of Florisil (synthetic magnesium silicate). The product was eluted with twelve fractions of 25 milliliters each of ten percent acetone in Skellysolve B hexanes. Fractions five to seven, inclusive, gave 36 milligrams of 2α-methyl-6α-fluoro - 11β,17α-dihydroxy-4-pregnene-3,20-dione which were recrystallized from ethyl acetate and Skellysolve B hexanes to give 34 milligrams of 2α-methyl-6α-fluoro-11β,17α-dihydroxy-4-pregnene-3,20-dione melting at 265 to 267 degrees centigrade, and having an $[\alpha]_D$ plus 46 degrees in dioxane; λ max. 239 mu, $a_M$ 14,050 in ethanol; and infrared maxima, in mineral oil mull, at 1635, 1657, 1705 and 3400 cm.$^{-1}$.

EXAMPLE 4D

*2α-methyl-6α-fluoro-17α-hydroxy-4-pregnene-3,11,20-trione (XXIX)*

A mixture is prepared containing 0.5 gram of 2α-methyl - 6α - fluoro-11β,17α-dihydroxy-4-pregnene-3,20-dione (XXVIII), 0.15 gram of chromium trioxide, ten milliliters of glacial acetic acid and one-half milliliter of water. This mixture is stirred and maintained for eight hours at room temperature. Thereafter the mixture is poured into fifty milliliters of ice water, neutralized by the addition of dilute sodium hydroxide, and the resulting precipitate collected on a filter and recrystallized from ethyl acetate-Skellysolve B hexanes to give 2α-methyl-6α-fluoro-17α-hydroxy-4-pregnene-3,11,20-trione, a crystalline solid.

EXAMPLE 5D

*2α-methyl-6α-fluoro-17α,21-dihydroxy-4-pregnene-3,11,20-trione 21-methanesulfonate*

Following the procedure of Example 1D, reaction of one gram of 2α-methyl-6α-fluoro-17α,21-dihydroxy-4-pregnene-3,11,20-trione in seven milliliters of pyridine with 0.3 milliliter of methanesulfonyl chloride in pyridine solution yields 2α-methyl-6α-fluoro-17α,21-dihydroxy-4-pregnene-3,11,20-trione 21-methanesulfonate, a crystalline solid.

EXAMPLE 6D

*2α-methyl-6α-fluoro-17α-hydroxy-21-iodo-4-pregnene-3,11,20-trione*

Following the procedure of Example 2D, reaction of the 21-methanesulfonate from Example 5D with sodium iodide in acetone is productive of 2α-methyl-6α-fluoro-17α-hydroxy-21-iodo-4-pregnene-3,11,20-trione, a crystalline solid.

EXAMPLE 7D

*2α-methyl-6α-fluoro-17α-hydroxy-4-pregnene-3,11,20-trione*

Crude 2α-methyl - 6α - fluoro-17α-hydroxy-21-iodo-4-pregnene-3,11,20-trione from Example 6D is slurried with fifteen milliliters of glacial acetic acid and stirred at room temperature for a period of 45 minutes. Thereafter one gram of zinc dust is added and stirring continued for an additional fifteen minutes. The excess zinc dust is removed by filtration, and the filtrate is diluted with methylene chloride and washed with water in cold sodium bicarbonate solution until all the acetic acid is neutralized. After drying over anhydrous sodium sulfate, the solution is chromatographed over synthetic magnesium silicate. Recrystallization from acetone-Skellysolve B hexanes is productive of essentially pure 2α-methyl - 6α-fluoro-17α-hydroxy-4-pregnene-3,11,20-trione.

EXAMPLE 8D

*2-methyl-6α-fluoro-11β,17α-dihydroxy-1,4-pregnadiene-3,20-dione (XXX)*

Five 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500 milliliter volume is used as an inoculum for ten liters of the same glucose-corn steep liquor medium which in addition contains five milliliters of an antifoam compound (a mixture of lard oil and octadecanol). The fermentor is placed into the waterbath, adjusted to 28 degrees centigrade and the contents stirred thoroughly (300 r.p.m.) and aerated (0.1 liter of air per minute to ten liters of beer). After twenty hours of incubation; when a good growth has been developed, one gram of 2α-methyl-6α-fluoro-11β,17α-dihydroxy-4-pregnene-3,20-dione (XXVIII) plus one half gram of 3-ketobisnor-4-cholen-22-al dissolved in sixteen milliliters of dimethylformamide is added and the incubation carried out at the same temperature (28 degrees centigrade) and aeration for a period of 24 hours (final pH 8.3). The mycelium is filtered off and extracted with three 200 milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α-fluoro-11β,17α-dihydroxy-1,4-pregnadiene-3,20-dione, a crystalline solid.

EXAMPLE 9D

*2-methyl-6α-fluoro-17α-hydroxy-1,4-pregnadiene-3,11,20-trione (XXXI)*

Five 100-milliliter portions of a medium, in 250 milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500 milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α-fluoro-17α-hydroxy-4-pregnene-3,11,20-trione dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl - 6α - fluoro-17α-hydroxy-1,4-pregnadiene-3,11,20-trione, a crystalline solid.

EXAMPLE 10D

*6β-epimers*

Substitution of the 6β-epimers for the starting materials in each of the preceding examples and maintaining near neutral reaction conditions is productive of the corresponding 2-methyl-6β-fluoro products, including 2α-methyl - 6β - fluoro-11β,17α,21-trihydroxy-4-pregnene-3,20-dione 21-methanesulfonate, 2α-methyl-6β-fluoro-21-iodo-11β,17α - dihydroxy-4-pregnene-3,20-dione, 2α-methyl-6β-fluoro-11β,17α-dihydroxy-4-pregnene-3,20-dione, 2α-methyl - 6β - fluoro - 17α-hydroxy-4-pregnene-3,11,20-trione, 2-methyl-6β-fluoro-11β,17α-dihydroxy-1,4-pregnadiene-3,20-dione, and 2-methyl-6β-fluoro-17α-hydroxy-1,4-pregnadiene-3,11,20-trione.

The thus obtained 6β-epimers yield the 6α-epimers by treatment, at temperatures of zero degrees centigrade or slightly lower and in an organic solvent such as chloroform, with an anhydrous mineral acid, such as hydrochloric acid, in the presence of alcohol. The lower temperatures should be maintained throughout the period of acid addition. Purification by washing with successive portions of dilute alkali followed by evaporation under reduced pressure gives the 6α-epimer in high yield.

EXAMPLE 1E

*2α-methyl-6α,21-difluoro-11β,17α-dihydroxy-4-pregnene-3,20-dione (XXXIV)*

A mixture of 200 milligrams of 2α-methyl-6α-fluoro-11β,17α-dihydroxy-4-pregnene-3,20-dione 21-methanesulfonate (XXXIII) and 100 milligrams of potassium fluoride in two milliliters of dimethylsulfoxide is heated on a steam bath for a period of about seventeen hours. The reaction mixture is then diluted with fifty milliliters of methylene chloride and washed three times with ten milliliters of water. After drying over sodium sulfate, the methylene chloride solution is passed over a column of ten grams of synthetic magnesium silicate. Elution with Skellysolve B hexanes plus acetone first gives crude crystals of 2α-methyl-6α-fluoro-11β-hydroxy-17α,21-epoxy-4-pregnene-3,20-dione. This compound possesses pharmacological properties similar to those of compounds XXXIV and XXXV, though to a modified degree, and in addition possess particularly marked diuretic activity in that it causes a loss of salt and water which makes it especially valuable in the treatment of cirrhosis of the liver, the nephrotic syndrome, and the treatment of eclampsia and pre-eclampsia.

Further elution with Skellysolve B hexanes plus acetone yields 2α-methyl - 6α,21 - difluoro - 11β,17α-dihydroxy-4-pregnene-3,20-dione which on recrystallization from ethyl acetate-Skellysolve B hexanes gives essentially pure 2α-methyl-6α,21 - difluoro - 11β,17α - dihydroxy-4-pregnene-3,20-dione, a crystalline solid.

EXAMPLE 2E

*2α-methyl-6α,21-difluoro-17α-hydroxy-4-pregnene-3,11,20-trione (XXXV)*

A solution is prepared containing 0.5 gram of 2α-methyl-6α,21-difluoro-11β,17α - dihydroxy - 4 - pregnene-3,20-dione, 0.15 gram of chromium trioxide, ten milliliters of glacial acetic acid and one-half milliliter of water. This mixture is stirred and maintained at room temperature for a period of about eight hours. Thereafter the mixture is poured into fifty milliliters of ice water, neutralized by the addition of dilute sodium hydroxide, and the thus obtained precipitate collected on a filter and recrystallized three times from ethyl acetate and Skellysolve B hexanes to give 2α-methyl-6α,21-difluoro-17α-hydroxy-4-pregnene-3,11,20-trione.

Alternatively, 2α - methyl - 6α,21-difluoro-17α-hydroxy-4-pregnene-3,11,20-trione can be produced by employing 2α-methyl-6α-fluoro-17α - hydroxy - 4 - pregnene-3,11,20-trione 21-methanesulfonate as the starting material in Example 1E and following the procedure of Example 1E.

EXAMPLE 3E

*2α-methyl-6α,21-difluoro-11β,17α-dihydroxy-4-pregnene-3,20-dione (XXXIV)*

To a solution of 0.57 gram of 2α-methyl-6α-fluoro-11β,17α - dihydroxy - 21 - iodo - 4 - pregnene-3,20-dione (XXXVIII) in 55 milliliters of acetonitrile at fifty to sixty degrees centigrade in the dark, is added 0.4 milliliter of fifty percent aqueous solution of silver fluoride. Addition is done in three equal portions at one-half hour intervals. After maintaining at this temperature for a total period of about one and one-half hours, the temperature is lowered to forty to fifty degrees centigrade for an additional period of about two and one-half hours. The solvent is then removed under reduced pressure at fifty degrees centigrade and the black residue is digested with three fifty-milliliter portions of acetone. The product, contained in the acetone solution, is purified by chromatography over a column of synthetic magnesium silicate and crystallized from acetone-Skellysolve B hexanes to give 2α - methyl - 6α,21 - difluoro - 11β,17α - dihydroxy-4-pregnene-3,20-dione, a crystalline solid.

Substitution of 2α - methyl-6α-fluoro-17α-hydroxy-21-iodo-4-pregnene-3,11,20 trione as the starting material in the foregoing reactions of Example 3E is productive of 2α-methyl-6α,21 - difluoro - 17α - hydroxy - 4 - pregnene-3,11,20-trione. Alternatively, 2α-methyl-6α,21-difluoro-11β,17α-dihydroxy-4-pregnene-3,20-dione can be oxidized to 6α,21-difluoro-17α-hydroxy-4-pregnene-3,11,20 trione, as indicated in Example 2E.

EXAMPLE 4E

*2α-methyl-6α,21-difluoro-11β,17α-dihydroxy-1,4-pregnadiene-3,20-dione (XXXVI)*

Five 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two days vegetative growth of *Septomyxa affinis* A.T.C.C. 6737. The Erlenmeyer flasks are shaken at room temperature (about 26 to 28 degrees centigrade) for a period of three days. At the end of this period this 500 milliliter volume is used as in inoculum for ten liters of the same glucose-corn steep liquor medium which in addition contains five milliliters of an antifoam compound (a mixture of lard oil and octadecanol). The fermentor is placed into the water-bath, adjusted to 28 degrees centrigrade and the contents stirred thoroughly (300 r.p.m.) and aerated (0.1 liter of air per minute to ten liters of beer). After twenty hours of incubation; when a good growth has been developed, one gram of 2α-methyl-6,21-difluoro - 11β,17α - dihydroxy-4-pregnene-3,20-dione (XXXIV) plus 0.5 gram of 3-ketobisnor-4-cholen-22-al dissolved in sixteen milliliters of dimethylformamide is added and the incubation carried out at the same temperature (28 degrees centigrade) and aeration for a period of 48 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α - fluoro-11β,17α - dihydroxy-1,4-pregnadiene-3,20-dione, a crystalline solid.

EXAMPLE 5E 2-methyl-6α,21-difluro-17α-hydroxy-1,4-pregnadiene-3,11,20-trione (XXXVII)

Five 100-milliliter portions of a medium, in 250 milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A.T.C.C. 6737. The Erlenmeyer flasks are shaken at room temperature (about 26 to 28 degrees centigrade) for a psriod of three days. At the end of this period this 500 milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α,21-difluoro-17α-hydroxy-4-pregnene-3,11,20-trione dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α,-21-difluoro-17α-hydroxy-1,4-pregnadiene-3,11,20-trione, a crystalline solid.

EXAMPLE 6E

6β-epimers

Substitution of the 6β-epimers for the starting materials in each of the preceding examples and maintaining near neutral reaction conditions is productive of the corresponding 2α-methyl-6β,21-difluoro products, including 2α-methyl - 6β,21 - difluoro - 11β,17α - dihydroxy - 4 - pregnene-3,20-dione, 2α-methyl-6β-fluoro-11β-hydroxy-17α,21-epoxy - 4 - pregnene-3,20-dione, 2α-methyl-6β,21-difluoro-17α - hydroxy-4-pregnene-3,11,20-trione, 2-methyl-6β,21-difluoro - 11β,17α - dihydroxy - 1,4 - pregnadiene - 3,20-dione, and 2-methyl-6β,21-difluoro-17α-hydroxy-1,4-pregnadiene-3,11,20-trione.

2α - methyl - 6β - fluoro - 11β - hydroxy-17α,21-epoxy-4-pregnene-3,20-dione possesses, in general, the same activities as those of the corresponding 6α-fluoro compound.

The thus obtained 6β-epimers yield the 6α-epimers by treatment, at temperatures of zero degrees centigrade or slightly lower and in an organic solvent such as chloroform, with an anhydrous mineral acid, such as hydrochloric acid, in the presence of alcohol. The lower temperatures should be maintained throughout the period of acid addition. Purification by washing with successive portions of dilute alkali followed by evaporation under reduced pressure gives the 6α-epimer in high yield.

EXAMPLE 1F

2α - methyl - 6α,9α - difluoro - 11β,17α,21-trihydroxy-4-pregnene-3,20-dione 21-methanesulfonate (XLI)

To a solution of 500 milligrams of 2α-methyl-6α,9α-difluoro-11β,17α,21-trihydroxy-4-pregnene-3,20-dione (XL) in six milliliters of pyridine previously cooled to zero to five degrees centigrade is added 0.55 milliliter of methanesulfonyl chloride. The reaction mixture is stirred at approximately six degrees centigrade until completion of the reaction and then poured into cold five percent hydrochloric acid solution. The resulting solid mesylate, 2α-methyl - 6α,9α - difluoro - 11β,17α,21 - trihydroxy - 4-pregnene - 3,20 - dione 21-methanesulfonate is filtered, washed with water and dried.

EXAMPLE 2F

2α - methyl - 6α,9α - difluoro - 11β,17α - dihydroxy - 21-iodo-4-pregnene-3,20-dione (XLII) and 2α-methyl-6α, 9α - difluoro - 11β,17α - dihydroxy - 4 - pregnene - 3, 20-dione (XLIII)

To a solution of 70 milligrams of crude 2α-methyl-6α, 9α - difluoro - 11β,17α,21 - trihydroxy - 4 - pregnene-3,20-dione 21-methanesulfonate (XLI) in ten milliliters of acetone is added a solution of 370 milligrams of sodium iodide in four milliliters of acetone. The mixture is stirred at room temperature for a period of about twenty minutes and at reflux for approximately fifteen minutes and is then evaporated to dryness at reduced pressure. The residue containing 2α-methyl-6α,9α-difluoro-11β,17α-dihydroxy-21-iodo-4-pregnene-3,20-dione is dissolved in five milliliters of acetic acid and stirred for a period of about 45 minutes. A solution of 600 milligrams of sodium thiosulfate in 7.2 milliliters of water is added to the acetic acid solution, followed by the addition of seventy milliliters of ice and water. The resulting solid is isolated by filtration, and is chromatographed over synthetic magnesium silicate and crystallized from acetone-Skellysolve B hexanes mixture to give 2α-methyl-6α, 9α - difluoro-11β,17α-dihydroxy-4-pregnene-3,20-dione, a crystalline solid. Additional product is obtained by extracting the water phase from the above precipitation step with methylene chloride, followed by chromatographing and crystallizing as above.

Alternatively, the 2α-methyl-6α,9α-difluoro-11β,17α-dihydroxy-21-iodo-4-pregnene-3,20-dione can be purified by recrystallization from methylene chloride.

EXAMPLE 3F

2α-methyl-6α,9α-difluoro-17α-hydroxy-4-pregnene-3,11,20-trione (XLIV)

A solution is prepared containing 0.5 gram of 2α-methyl - 6α,9α - difluoro - 11β,17α-dihydroxy-4-pregnene-3,20-dione (XLIII), 0.15 gram of chromium trioxide, ten milliliters of glacial acetic acid and one-half milliliter of water. This mixture is stirred and maintained at room temperature until completion of the reaction. Thereafter excess oxidant is destroyed by the addition of methanol and the mixture is poured into ice water. The thus precipitated 2α - methyl - 6α,9α-difluoro-17α-hydroxy-4-pregnene-3,11,20-trione is collected on a filter, washed with water, and dried.

Alternatively, starting with 2α-methyl-6α,9α-difluoro-17α,21-dihydroxy-4-pregnene-3,11,20-trione and reacting this with methanesulfonyl chloride to produce the 21-methanesulfonate, then treating the 21-methanesulfonate with sodium iodide in acetone to produce the 21-iodide, and treating the 21-iodide with sodium thiosulfate, as shown in Examples 1F and 2F, is productive of 2α-methyl - 6α,9α-difluoro-17α-hydroxy-4-pregnene-3,11,20-trione (XLIV).

EXAMPLE 4F

*2α-methyl-6α-fluoro-9α-chloro-11β,17α-dihydroxy-4-pregnene - 3,20-dione and 2α-methyl-6α-fluoro-9α-bromo-11β,17α-dihydroxy-4-pregnene-3,20-dione (XLIII)*

In the same manner given in Examples IF and 2F, reacting in pyridine solution 2α-methyl-6α-fluoro-9α-chloro - 11β,17α,21 - trihydroxy - 4 - pregnene-3,20-dione (XL) with methanesulfonyl chloride, reacting the thus produced 21-methanesulfonate with sodium iodide in acetone to produce the 21-iodide, and reducing the 21-iodide wtih aqueous sodium thiosulfate is productive of 2α-methyl - 6α - fluoro-9α-chloro-11β,17α-dihydroxy-4-pregnene-3,20-dione.

Similarly, starting with 2α-methyl-6α-fluoro-9α-bromo-11β,17α,21-trihydroxy-4-pregnene-3,20-dione is productive of 2α-methyl-6α-fluoro-9α-bromo-11β,17α-dihydroxy-4-pregnene-3,20-dione.

EXAMPLE 5F

*2α-methyl-6α-fluoro-9α-chloro-17-hydroxy-4-pregnene-3,11,20-trione and 2α-methyl-6α-fluoro-9α-bromo-17α hydroxy-4-pregnene-3,11,20-trione (XLIV)*

In the same manner given in Example 3F, reacting 2α-methyl - 6α - fluoro - 9α - chloro - 11β,17α - dihydroxy-4-pregnene-3,20-dione with chromium trioxide in acetic acid and water is productive of 2α-methyl-6α-fluoro-9α-chloro - 17α-hydroxy-4-pregnene-3,11,20-trione. Similarly, starting with 2α-methyl-6α-fluoro-9α-bromo-11β,17α-dihydroxy - 4 - pregnene - 3,20 - dione is productive of 6α-fluoro - 9α - bromo - 17α - hydroxy - 4-pregnene-3,11,20-trione. Alternatively, starting with 2α-methyl-6α-fluoro-9α-chloro-17α,21-dihydroxy-4 - pregnene - 3,11,20 - trione and reacting this with methanesulfonyl chloride to produce the 21-methanesulfonate, then treating the 21-methanesulfonate with sodium iodide in acetone to produce the 21-iodide, and treating the 21-iodide with sodium thiosulfate as shown in Examples 1F and 2F, is productive of 2α - methyl - 6α - fluoro - 9α - chloro - 17α - hydroxy-4-pregnene-3,11,20 - trione. Similarly, starting with 2α-methyl - 6α - fluoro - 9α - bromo - 17α,21 - dihydroxy - 4-pregnene - 3,11,20-trione is productive of 6α - fluoro - 9α-bromo-17α-hydroxy-4-pregnene-3,11,20-trione.

EXAMPLE 6F

*2-methyl-6α,9α-difluoro-11β,17α-dihydroxy-1,4-pregnadiene-3,20-dione (XLV)*

Five 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500 milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α,9α-difluoro-11β,17α-dihydroxy-4-pregnene-3,20-dione (XLIII) plus one-half gram of 3-ketobisnor-4-cholen-22-al dissolved in sixteen milliliters of dimethylformamide is added and the incubation carried out at the same temperature (28 degrees centigrade) and aeration for a period of 48 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α,9α-difluoro-11β,17α-dihydroxy-1,4-pregnadiene-3,20-dione, a crystalline solid.

In like manner, substitution of 2α-methyl-6α-fluoro-9α-chloro-11β,17α-dihydroxy-4-pregnene-3,20-dione and 2α-methyl - 6α - fluoro - 9α - bromo-11β,17α-dihydroxy-4-pregnene - 3,20-dione for 2α - methyl - 6α,9α - difluoro-11β,17α-dihydroxy-4-pregnene-3,20-dione is productive of 2 - methyl - 6α - fluoro - 9α - chloro-11β,17α-dihydroxy-1,4 - pregnadiene - 3,20 - dione and 2-methyl-6α-fluoro-9α - bromo - 11β,17α - dihydroxy - 1,4-pregnadiene-3,20-dione respectively.

EXAMPLE 7F

*2-methyl-6α,9α-difluoro-17α-hydroxy-1,4-pregnadiene-3,11,20-trione (XLVI)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500 milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α,9α-difluoro-17α-hydroxy-4-pregnene-3,11,20-trione (XLIV) dissolved in sixteen milliliters of dimethyl-formamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α,9α-difluoro-17α-hydroxy-1,4-pregnadiene-3,11,20-trione, a crystalline solid.

In like manner, substitution of 2α-methyl-6α-fluoro-9α-chloro-17α-hydroxy-4-pregnene-3,11,20-trione or 2α-methyl-6α-fluoro-9α-bromo-17α - hydroxy - 4 - pregnene-3,11,20-trione for 2α-methyl-6α,9α-difluoro-17α-hydroxy-4-pregnene-3,11,20-trione is productive of 2-methyl-6α-fluoro-9α-chloro-11β,17α-dihydroxy-1,4-pregnadiene-3,20-dione and 2-methyl-6α-fluoro-9α-bromo-17α-hydroxy-1,4-pregnadiene-3,11,20-trione, respectively.

EXAMPLE 8F

*6β-epimers*

Substituting 2α-methyl-6β,9α-difluoro-11β,17α,21-trihydroxy-4-pregnene-3,20-dione for the starting material in Example 1 and retaining the 6β-configuration in subsequent steps by careful maintenance of near neutral reaction conditions, 6β-epimers, such as 2α-methyl-6β,9α-difluoro - 11β,17α - dihydroxy - 4 - pregnene - 3,20 - dione, 2α - methyl - 6β - fluoro - 9α - chloro - 11β,17α - dihydroxy-4-pregnene-3,20-dione, 2α-methyl - 6β - fluoro - 9α-bromo-11β,17α-dihydroxy-4 - pregnene - 3,20 - dione, 2α-methyl - 6β,9α - difluoro - 17α - hydroxy - 4 - pregnene-3,11,20 - trione, 2α - methyl - 6β - fluoro - 9α - chloro-17α - hydroxy - 4 - pregnene - 3,11,20 - trione, 2α-methyl - 6β - fluoro - 9α - bromo - 17α - hydroxy - 4-pregnene-3,11,20-trione, 2-methyl-6β,9α-difluoro-11β,17α-dihydroxy - 1,4 - pregnadine - 3,20 - dione, 2 - methyl-6β - fluoro - 9α - chloro - 11β,17α - dihydroxy - 1,4-pregnadiene - 3,20 - dione, 2-methyl - 6β - fluoro - 9α-bromo - 11β,17α - dihydroxy - 1,4 - pregnadiene - 3,20-dione, 2 - methyl - 6β,9α - difluoro - 17α - hydroxy - 1,4-pregnadiene - 3,11,20 - trione, 2 - methyl - 6β - fluoro-9α - chloro - 17α - hydroxy - 1,4 - pregnadiene - 3,11,20-trione and 2-methyl-6β-fluoro-9α-bromo-17α-hydroxy-1,4-pregnadiene-3,11,20-trione are produced, which can be isolated from the reaction mixture. The thus obtained 6β-epimers yield the 6α-epimers by treatment with and acid or base in an organic solvent.

EXAMPLE 1G

2α-methyl-6α,9α,21-trifluoro-11β,17α-dihydroxy-4-pregnene-3,20-dione (XLIX)

A mixture of 200 milligrams of 2α-methyl-6α-fluoro-11β,17α-dihydroxy-4-pregnene-3,20-dione 21-methanesulfonate (XLVIII) and 100 milligrams of potassium fluoride in two milliliters of dimethylsulfoxide is heated on a steam bath until completion of the reaction. The reaction mixture is then diluted with fifty milliliters of methylene chloride and washed three times with ten milliliters of water. After drying over sodium sulfate, the methylene chloride solution is passed over a column of ten grams of synthetic magnesium silicate. Elution with Skellysolve B hexanes plus acetone first gives crude crystals of 2α-methyl-6α,9α-difluoro11β-hydroxy-17α,21-epoxy-4-pregnene-3,20-dione. This compound possesses pharmacological properties similar to those of compounds XLIX and L, though to a modified degree and in addition possesses particularly marked diuretic activity in that it causes a loss of salt and water which makes it especially valuable in the treatment of cirrhosis of the liver, the nephrotic syndrome, and the treatment of eclampsia and pre-eclampsia.

Further elution with Skellysolve B hexanes plus acetone yields 2α-methyl-6α,9α,21-trifluoro-11β,17α-dihydroxy-4-pregnene-3,20-dione, which on recrystallization from ethyl acetate-Skellysolve B hexanes gives essentially pure 2α-methyl-6α,9α,21-trifluoro-11β,17α-dihydroxy-4-pregnene-3,20-dione, a crystalline solid.

EXAMPLE 2G

2α-methyl-6α,21-difluoro-9α-chloro-11β,17α-dihydroxy-4-pregnene-3,20-dione (XLIX)

Following the procedure of Example 1G but substituting 2α-methyl-6α-fluoro-9α-chloro - 11β,17α,21 - trihydroxy-4-pregnene-3,20 - dione 21 - methanesulfonate as starting material therein is productive of 2α-methyl-6α,21-difluoro - 9α - chloro - 11β,17α - dihydroxy - 4 - pregnene-3,20-dione, a crystalline solid and 2α-methyl-6α-fluoro-9α - chloro - 11β - hydroxy - 17α,21 - epoxy - 4 - pregnene-3,20-dione, a crystalline solid. The latter compound possesses pharmacological properties similar to those of 2α - methyl - 6α,6α - difluoro - 11β - hydroxy - 17α,21-epoxy-4-pregnene-3,20-dione of Example 1G.

EXAMPLE 3G

2α-methyl-6α,21-difluoro-9α-bromo-11β,17α-dihydroxy-4-pregnene-3,20-dione (XLIX)

Following the procedure of Example 1G but substituting 2α - methyl - 6α - fluoro - 9α - bromo - 11β,17α,21-trihydroxy - 4 - pregnene - 3,20 - dione 21 - methanesulfonate as starting material is productive of 2α-methyl-6α,21 - difluoro - 9α - bromo - 11β,17α - dihydroxy - 4-pregnene - 3,20 - dione, a crystalline solid, and 2α-methyl - 6α - fluoro - 9α - bromo - 11β - hydroxy - 17α,21-epoxy-4-pregnene-3,20 dione, a crystalline solid. The latter compound possesses pharmacological properties similar to those of 2α - methyl - 6α,9α - difluoro - 11β-hydroxy - 17α,21 - epoxy - 4 - pregnene - 3,20 - dione of Example 1G.

EXAMPLE 4G

2α-methyl-6α,9α,21-trifluoro-11β,17α-dihydroxy-4-pregnene-3,20-dione (XLIX)

To a solution of 0.57 gram of 2α - methyl - 6α,9α-difluoro - 11β,17α - dihydroxy - 21 - iodo - 4 - pregnene-3,20 - dione (LIII), in 55 milliliters of acetonitrile at fifty to sixty degrees in the dark, is added 0.4 milliliter of fifty percent aqueous solution of silver fluoride. Addition is done in three equal portions at one-half hour intervals. After maintaining this temperature for a total period of about one and one-half hours, the temperature is lowered to forty to fifty degrees centigrade for an additional period of about two and one-half hours. The solvent is then removed under reduced pressure at fifty degrees centigrade and the residue is digested with three fifty-milliliter portions of acetone. The product, contained in the acetone solution, is purified by chromatography over a column of synthetic magnesium silicate and is crystallized from acetone-Skellysolve B hexanes to give 2α - methyl - 6α,9α,21 - trifluoro - 11β,17α - dihydroxy-4 - pregnene - 3,20 - dione, a crystalline solid.

In like manner, substitution of 2α-methyl-6α-fluoro-9α - chloro - 11β,17α - dihydroxy - 21 - iodo - 4 - pregnene - 3,20 - dione or 2α - methyl - 6α - fluoro - 9α-bromo - 11β,17α - dihydroxy - 21 - iodo - 4 - pregnene-3,20 - dione for 2α - methyl - 6α,9α - difluoro 11β,17α-dihydroxy - 21 - iodo - 4 - pregnene - 3,20 - dione is productive of 2α - methyl - 6α,21 - difluoro - 9α - chloro-11β,17α-dihydroxy - 4 - pregnene - 3,20 - dione and 2α-methyl - 6α,21 - difluoro - 9α - bromo - 11β,17α - dihydroxy - 4 - pregnene - 3,20 - dione, respectively.

EXAMPLE 5G

2α-methyl-6α,9α,21-trifluoro-17α-hydroxy-4-pregnene-3,11,20-trione (L)

A solution is prepared containing 0.5 gram of 2α-methyl-6α,9α,21-trifluoro-11β,17α-dihydroxy-4 - pregnene-3,20-dione (XLIX) 0.15 gram of chromium trioxide, ten milliliters of glacial acetic acid and one-half milliliter of water. This mixture is stirred and maintained at room temperature until completion of the reaction. Thereafter, the excess oxidant is destroyed by addition of methanol and the mixture is poured into ice water. The resulting precipitate is collected on a filter and recrystallized from ethyl acetate giving 2α-methyl-6α,9α,21-trifluoro-17α-hydroxy-4-pregnene-3,11,20-trione (L), a crystalline solid.

In like manner, substitution of 2α-methyl-6α,21-difluoro-9α-chloro-11β,17α - dihydroxy - 4 - pregnene-3,20-dione or 2α-methyl-6α,21-difluoro-9α-bromo-11β,17α-dihydroxy-4-pregnene-3,20-dione for 2α-methyl-6α,9α,21-trifluoro-11β,17α-dihydroxy-4-pregnene-3,20-dione is productive of 2α-methyl-6α,21-difluoro-9α-chloro-17α-hydroxy-4-pregnene-3,11,20-trione and 2α-methyl-6α,21-difluoro-9α-bromo-17α-hydroxy-4-pregnene-3,11,20 - trione, respectively.

EXAMPLE 6G

2α - methyl - 6α,9α,21-trifluoro-17α-hydroxy-4-pregnene-3,11,20-trione, 2α-methyl-6α,21-difluoro-9α-chloro-17α-hydroxy - 4 - pregnene-3,11,20-trione, and 2α-methyl-6α,21-difluoro-9α-bromo-17α - hydroxy - 4 - pregnene-3,11,20-trione (L)

In the same manner shown in Example 1G, treating 2α-methyl-6α,9α-difluoro-17α,21 - dihydroxy-4-pregnene-3,11,20-trione 21-methanesulfonate, 2α-methyl-6α-fluoro- 9α-chloro-17α,21-dihydroxy-4-pregnene-3,11,20-trione 21-methanesulfonate, and 2α-methyl-6α-fluoro-9α-bromo-17α,21-dihydroxy-4-pregnene-3,11,20-trione 21-methanesulfonate with potassium fluoride in dimethylsulfoxide produces 2α-methyl-6α,9α,21-trifluoro-17α-hydroxy-4-pregnene-3,11,20-trione, 2α-methyl-6α,21-difluoro-9α-chloro-17α-hydroxy-4-pregnene-3,11,20-trione, and 2α-methyl-6α,21-difluoro-9α-bromo-17α-hydroxy-4-pregnene-3,11,20-trione, respectively.

Alternatively, in the same manner shown in Example 4G, treating a solution of 2α-methyl-6α,9α-difluoro-17α-hydroxy-21-iodo-4-pregnene-3,11,20-trione, 2α-methyl-6α-fluoro-9α-chloro-17α-hydroxy-21-iodo-4-pregnene-3,11,20-trione, or 2α-methyl-6α-fluoro-9α-bromo-17α-hydroxy-21-iodo-4-pregnene-3,11,20-trione in acetonitrile with an aqueous solution of silver fluoride produces 2α-methyl-6α,9α-21-trifluoro-17α-hydroxy-4-pregnene-3,11,20-trione, 2α-methyl-6α,21-difluoro-9α-chloro-4-pregnene-3,11,20-trione, and 2α-methyl-6α,21-difluoro-9α-bromo-17α-hydroxy-4-pregnene-3,11,20-trione, respectively.

EXAMPLE 7G

*2-methyl-6α,9α,21-trifluoro-11β,17α-dihydroxy-1,4-pregnadiene-3,20-dione (LI)*

Five 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500 milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α,9α,21-trifluoro-11β,17α-dihydroxy-4-pregnene-3,20-dione (XLIX) plus 0.5 gram of 3-ketobisnor-4-cholen-22-al dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α,9α,21-trifluoro-11β,17α-dihydroxy-1,4-pregnadiene-3,20-dione (LI), a crystalline solid.

In like manner, substitution of 2α-methyl-6α,21-difluoro-9α-chloro-11β,17α-dihydroxy-4-pregnene-3,20-dione or 2α-methyl-6α,21-difluoro-9α-bromo-11β,17α-dihydroxy-4-pregnene-3,20-dione for 2α-methyl-6α,9α,21-trifluoro-11β,17α-dihydroxy-4-pregnene-3,20-dione is productive of 2-methyl-6α,21-difluoro-9α-chloro-11β,17α-dihydroxy-1,4-pregnadiene-3,20-dione and 2-methyl-6α,21-difluoro-9α-bromo-11β,17α-dihydroxy-1,4-pregnadiene-3,20-dione, respectively.

EXAMPLE 8G

*2-methyl-6α,9α,21-trifluoro-17α-hydroxy-1,4-pregnadiene-3,11,20-trione (LII)*

Five 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500 milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 2α-methyl-6α,9α,21-trifluoro-17α-hydroxy-4-pregnene-3,11,20-trione (L) dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is purified by chromatography over a Florisil anhydrous magnesium silicate column and recrystallized from acetone-Skellysolve B hexanes to give 2-methyl-6α,9α,21-trifluoro-17α-hydroxy-1,4-pregnadiene-3,11,20-trione, a crystalline solid.

In the same manner, substitution of 2α-methyl-6α,21-difluoro-9α-chloro-17α-hydroxy-4-pregnene-3,11,20-trione or 2α-methyl-6α,21-difluoro-9α-bromo-17α-hydroxy-4-pregnene-3,11,20-trione for 2α-methyl-6α,9α,21-trifluoro-17α-hydroxy-4-pregnene-3,11,20-trione is productive of 2-methyl-6α,21-difluoro-9α-chloro-17α-hydroxy-1,4-pregnadiene-3,11,20-trione and 2-methyl-6α,21-difluoro-9α-bromo-17α-hydroxy-1,4-pregnadiene-3,11,20-trione respectively.

EXAMPLE 9G

*6β-epimers*

Substituting the 6β-epimers for starting materials in each of the preceding examples and maintaining near neutral reaction conditions is productive of the corresponding 2-methyl-6β-fluoro products, such as 2α-methyl-6β,9α,21-trifluoro-11β,17α-dihydroxy-4-pregnene-3,20-dione, 2α-methyl-6β,9α-difluoro-11β-hydroxy-17α,21-epoxy-4-pregnen-3,20-dione, 2α-methyl-6β,21-difluoro-9α-chloro-11β,17α-dihydroxy-4-pregnene-3,20-dione, 2α-methyl-6β-fluoro-9α-chloro-11β-hydroxy-17α,21-epoxy-4-pregnen-3,20-dione. 2α-methyl-6β,21-difluoro-9α-bromo-11β,17α-dihydroxy-4-pregnene-3,20-dione, 2α-methyl-6β-fluoro-9α-bromo-11β-hydroxy-17α,21-epoxy-4-pregnene-3,20-dione, 2α-methyl-6β,9α,21-trifluoro-17α-hydroxy-4-pregnene-3,11,20-trione, 2α-methyl-6β,21-difluoro-9α-chloro-17α-hydroxy-4-pregnene-3,11,20-trione, 2α-methyl-6β,21-difluoro-9α-bromo-17α-hydroxy-4-pregnene-3,11,20-trione, 2-methyl-6β,9α,21-trifluoro-11β,17α-dihydroxy-1,4-pregnadiene-3,20-dione, 2-methyl-6β,21-difluoro-9α-chloro-11β,17α-dihydroxy-1,4-pregnadiene-3,20-dione, 2-methyl-6β,21-difluoro-9α-bromo-11β,17α-dihydroxy-1,4-pregnadiene-3,20-dione, 2-methyl-6β,9α,21-trifluoro-17α-hydroxy-1,4-pregnadiene-3,11,20-trione, 2-methyl-6β,21-difluoro-9α-chloro-17α-hydroxy-1,4-pregnadiene-3,11,20-trione and 2-methyl-6β,21-difluoro-9α-bromo-17α-hydroxy-1,4-pregnadiene-3,11,20-trione which can be isolated from the reaction mixture. The thus obtained 6β-epimers yield the 6α-epimers by treatment with acid or base in an organic solvent.

The 2α-methyl-6β-fluoro-9α-halo-11β-hydroxy-17α,21-epoxy-4-pregnene-3,20-diones possess, in general, the same activities as those of the corresponding 6α-fluoro compounds.

It is to be understood that the invention is not to be limited to the exact details of operation or exact compounds shown and described, as obvious modifications and equivalents will be apparent to one skilled in the art. The invention is therefore to be limited only by the scope of the appended claims.

We claim:
1. 2α - methyl - 6α - fluoro - 11β,17α - dihydroxy - 4 - pregnene-3,20-dione.
2. A compound of the formula:

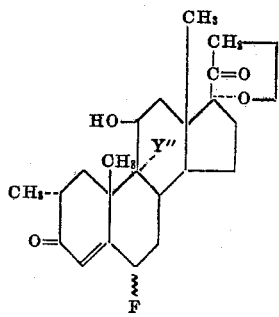

wherein Y" is selected from the group consisting of fluorine, chlorine and bromine.

3. 2α - methyl - 6,9α - difluoro - 11β - hydroxy - 17α, 21-epoxy-4-pregnen-3,20-dione.

References Cited in the file of this patent
UNITED STATES PATENTS

| | | |
|---|---|---|
| 2,837,464 | Nobile | June 3, 1958 |
| 2,838,498 | Magerlein et al. | June 10, 1958 |
| 2,838,499 | Spero et al. | June 10, 1958 |
| 2,838,502 | Beal et al. | June 10, 1958 |
| 2,838,535 | Magerlein et al. | June 10, 1958 |
| 2,838,536 | Magerlein et al. | June 10, 1958 |
| 2,838,537 | Spero et al. | June 10, 1958 |
| 2,838,538 | Spero et al. | June 10, 1958 |
| 2,838,539 | Magerlein et al. | June 10, 1958 |
| 2,838,541 | Magerlein et al. | June 10, 1958 |
| 2,838,542 | Spero et al. | June 10, 1958 |
| 2,838,543 | Spero et al. | June 10, 1958 |
| 2,841,600 | Hogg et al. | July 1, 1958 |
| 2,852,511 | Fried | Sept. 16, 1958 |
| 2,884,421 | Magerlein et al. | Apr. 28, 1959 |

OTHER REFERENCES

Hogg et al.: J. Am. Chem. Soc., vol. 77, pages 6401–02 (1955).

UNITED STATES PATENT OFFICE
CERTIFICATE OF CORRECTION

Patent No. 2,989,523

June 20, 1961

Philip F. Beal III, et al.

It is hereby certified that error appears in the above numbered patent requiring correction and that the said Letters Patent should read as corrected below.

Column 17, line 19, for "20α-" read -- 2α- --; column 29, line 27, for "17b-" read -- 17α- --; column 30, line 10, for "-acetone" read -- -acetate --; column 44, line 60, in the title of EXAMPLE 4E, for "2α-methyl-" read -- 2-methyl- --; column 46, line 30, for "70" read -- 370 --; column 49, line 65, for "-6α,6α-" read -- -6α,9α- --.

Signed and sealed this 16th day of January 1962.

(SEAL)
Attest:

RNEST W. SWIDER
ttesting Officer

DAVID L. LADD
Commissioner of Patents